(12) United States Patent
Shavit

(10) Patent No.: US 12,179,908 B2
(45) Date of Patent: Dec. 31, 2024

(54) METHOD OF OPERATION YIELDING EXTENDED RANGE FOR SINGLE PILOT AIRCRAFT AND SYSTEMS USEFUL IN CONJUNCTION THEREWITH

(71) Applicant: ISRAEL AEROSPACE INDUSTRIES LTD., Lod (IL)

(72) Inventor: David Shavit, Karmei Yosef (IL)

(73) Assignee: ISRAEL AEROSPACE INDUSTRIES LTD., Lod (IL)

( * ) Notice: Subject to any disclaimer, the term of this patent is extended or adjusted under 35 U.S.C. 154(b) by 461 days.

(21) Appl. No.: 17/550,320

(22) Filed: Dec. 14, 2021

(65) Prior Publication Data

US 2022/0106030 A1    Apr. 7, 2022

Related U.S. Application Data

(62) Division of application No. 15/767,572, filed as application No. PCT/IL2016/051075 on Oct. 5, 2016, now Pat. No. 11,230,366.

(30) Foreign Application Priority Data

Oct. 20, 2015   (IL) ........................................ 242167

(51) Int. Cl.
*B64C 13/18*     (2006.01)
*B64C 13/20*     (2006.01)
(Continued)

(52) U.S. Cl.
CPC .............. *B64C 13/18* (2013.01); *B64C 13/20* (2013.01); *B64C 13/22* (2013.01); *G05D 1/106* (2019.05);
(Continued)

(58) Field of Classification Search
CPC ......... B64C 13/18; B64C 13/20; B64C 13/22; G05D 1/106; G05D 1/101; G08G 5/0013;
(Continued)

(56) References Cited

U.S. PATENT DOCUMENTS

| 7,271,740 B2 | 9/2007 | Fischer |
| 7,437,225 B1 | 10/2008 | Rathinam |

(Continued)

FOREIGN PATENT DOCUMENTS

GB    1283224 A    7/1972

OTHER PUBLICATIONS

"A Future Without Fear?", Air Traffic Management, Apr. 17, 2015, 10 pages.
(Continued)

*Primary Examiner* — Shon G Foley
(74) *Attorney, Agent, or Firm* — Dorsey & Whitney LLP

(57) ABSTRACT

Aviation method comprising performing a single-pilot flight of inter-continental duration T>tp=predetermined single-pilot maximal single pilot flight duration; including using pilot-in-command logic empower a single airborne pilot to pilot via an airborne man-machine interface (MMI), only for a time window W<tp, where W includes at least an initial climbing phase of duration t1 and a final descent phase of duration t3; and using pilot-in-command logic to pilot the aircraft during an intermediate cruising phase occurring between the initial climbing and final descent phases, without recourse to the airborne pilot except during an emergency, thereby to accomplish a single-pilot inter-continental flight of duration T>tp, while utilizing the human airborne pilot only for a time period W<tp.

8 Claims, 13 Drawing Sheets

(51) Int. Cl.
   *B64C 13/22* (2006.01)
   *G05D 1/00* (2006.01)
   *G08G 5/00* (2006.01)
(52) U.S. Cl.
   CPC ......... *G08G 5/0013* (2013.01); *G08G 5/0052* (2013.01); *G08G 5/0056* (2013.01); *G08G 5/0065* (2013.01)
(58) Field of Classification Search
   CPC .. G08G 5/0052; G08G 5/0056; G08G 5/0065; Y02T 50/40
   See application file for complete search history.

(56) References Cited

U.S. PATENT DOCUMENTS

| | | |
|---|---|---|
| 2003/0200013 A1 | 10/2003 | Chakravarty et al. |
| 2005/0004723 A1 | 1/2005 | Duggan et al. |
| 2006/0032978 A1* | 2/2006 | Matos ............... B64D 45/0059 244/118.5 |
| 2007/0029449 A1 | 2/2007 | Matos |
| 2009/0037032 A1 | 2/2009 | Volkov et al. |
| 2009/0105891 A1 | 4/2009 | Jones et al. |
| 2009/0273487 A1 | 11/2009 | Ferro et al. |
| 2010/0030406 A1 | 2/2010 | Christophe et al. |
| 2010/0174424 A1 | 7/2010 | Cornell et al. |
| 2013/0231582 A1 | 9/2013 | Prasad |
| 2016/0139597 A1* | 5/2016 | Letang ................ B64C 9/323 701/3 |
| 2018/0281948 A1 | 10/2018 | Tao et al. |

OTHER PUBLICATIONS

"An accurate flight planning system", Universal Weather & Aviation Inc, May 2015, 3 pages.

Baker, "Meet the man who flies planes from the ground", https://www.wired.co.uk/article/remote-control-aeroplane (Accessed Sep. 9, 2019), Jan. 23, 2014, 15 pages.

Bilimoria, et al., "Conceptual Framework for Single Pilot Operations", International Conference on Human-Computer Interaction in Aerospace (HCI-Aero 2014), Jul. 30, 2014-Aug. 1, 2014, 8 pages.

Johnson, et al., "Task Allocation for Single Pilot Operations: A Role for the Ground", HCI Aero 2012, 2012, 4 pages.

Lachter, et al., "Toward Single Pilot Operations: Developing a Ground Station", Proceedings of the HCI-AERO 2014 Conference, At Silicon Valley, California, Jan. 2014, 9 pages.

Lanzi, et al., "Introduction to ACROSS Project", ACROSS Forum Rome; Advanced Cockpit for Reduction of Stress and Workload, Jul. 31, 2014, 20 pages.

* cited by examiner

| PIC Task | PIC = P | PIC = RP | PIC = AMC |
|---|---|---|---|
| ATC Coordination | Both[1] | Both[1] | Out only[2] |
| Flight path control | Full[3] | By AP[4] | By AP[4] |
| Control by stick and throttle | Y | N | N |
| Set AP (auto-pilot) modes, | Y | Y | Y |
| Confirm route and altitude changes | Y[5] | Y[5] | N |
| Aircraft system control[6] | Full | Partial | Limited |

| Pilot In Command Task | Pilot In Command = Air Pilot (P) | Pilot In Command = Remote Pilot (RP) | Emergency: Pilot In Command = AMC 15 |
|---|---|---|---|
| Aircraft and ATC (air traffic control) Coordination | Voice and data communication may be managed by both pilots. Setting changes to the system may be done by both pilot but confirming the change to be activated is accepted enabled by AMC 15 only when done by air pilot (P) | Voice and data communication managed by both pilots. Setting changes to system done by both pilots but confirming change to be activated is accepted enabled by AMC 15 only by remote pilot (RP). AMC 15 accepts inputs from p by voice and from rp via data link | AMC 15 accepts no inputs, continues status & flight plan & broadcasts same via data link to ATC and ground station |
| Flight path control | AMC 15 accepts enabled inputs from p only, directly through stick and throttle or indirectly by p's management of auto pilot and auto throttle. FMS 231 Lateral and vertical navigation may be programmed by either pilot but execution thereof requires confirmation by air pilot | AMC 15 accepts enabled inputs to auto pilot and auto throttle 260 from RP only. Stick pedals and throttle are deactivated. FMS 231 lateral and vertical navigation programmed by either pilot but execution thereof requires RP confirmation | AMC 15 accepts no inputs, controls flight path AMC 15 typically program FMS 231 and select auto pilot and auto throttle lateral and vertical navigation mode that follow FMS flight guidance |
| Extent of pilot-in-command's control of non avionic systems 16 | Full authorization | Almost full authorization. certain predetermined critical actions such as shutting down an engine, cannot be accepted from the remote pilot | No (or almost no) authorization over and above what is typically controlled by today's automated system controllers |

METHOD OF OPERATION YIELDING EXTENDED RANGE FOR SINGLE PILOT AIRCRAFT AND SYSTEMS USEFUL IN CONJUNCTION THEREWITH

REFERENCE TO CO-PENDING APPLICATIONS

None.

FIELD OF THIS DISCLOSURE

The present invention relates generally to aircraft.

BACKGROUND FOR THIS DISCLOSURE

Publications such as http://www.wired.co.uk/technology ("Meet the man . . . ", David Baker) describe extensive (and thus far unsuccessful) efforts ongoing to take "drone technology into the world of civil aviation, . . . so that a pilotless Boeing 737 could potentially share airspace with the easyJet flight to Santorini . . . Pilotless planes will . . . be flown by an operator . . . on the ground who sends commands to the . . . "autopilot", which then manages adjustments to the throttle, flaps and rudder to change heading or altitude, and to take off or land", the goal being to "allow civil airspace to be opened up to UAVs".

A 2012 technical paper by NASA, https://www.google.co.il/?gws_rd=ssl#q=hci+2012+joel+single+transport+category, contemplates ground support for single pilot operations in "transport category aircraft" i.e. FAR-25.

The disclosures of all publications and patent documents mentioned in the specification, and of the publications and patent documents cited therein directly or indirectly, are hereby incorporated by reference. Materiality of such publications and patent documents to patentability is not conceded.

SUMMARY OF CERTAIN EMBODIMENTS

The following terms may be construed either in accordance with any definition thereof appearing in the prior art literature or in accordance with the specification, or as follows:

Auto-pilot: intended to include automated flight control used by most commercial planes to reduce pilot error and workload e.g. at key times like landing or takeoff.

Redundancy: If one or 2 flight-control computer/s crashes, is damaged by an attack, or suffers from "insanity" caused by electromagnetic pulses, others overrule the faulty one (or two); the aircraft continues safely, and the faulty computers may be ignored, turned off or re-booted. Typically, any flight-control computer whose results disagree with redundant others, is deemed faulty, and voted-out of control by the others.

FAR: The Federal Aviation Regulations

High-reliability: intended to include equipment produced using technology known in the art for high-criticality (e.g. safety critical) usage, e.g. including redundancy, which may be relied upon not to exceed pre-defined probabilities of failure e.g. a probability of failure of not more than 10exp(−9) for large aircraft and 10exp(−8) for small aircraft.

Satcom: generic term for satellite communications (including but not limited to the historical Satcom family of communications satellites).

ADS-B—Automatic dependent surveillance-broadcast
ADC—Air data computer
A/I—Anti ice system
AMC—Aircraft management computer
ASC—Aircraft system computer
CNI—Communication navigation and identification module
C/P—Co pilot
ECS—Environmental control system
ELEC—Electrical system
EVS—Enhanced visual system
DDA—Detect and avoid
DL—Data link
DPDU—Digital power distribution unit
Duty time—Time from pilot arriving to work until last landing
DU—Display unit
ENG—Aircraft engine
Flight time—Time from takeoff to land. Accumulate all flights performed by the pilot before rest
FAR-23—Regulations for small aircraft certification
FAR-91—Regulations for private flight operation
FAR-135—Regulations for on demand commercial flight operation
FBW—Fly by wire
FCS—Flight control system
FMS—Flight management system
GPWS—Ground proximity warning system
HYD—Hydraulic system
IAS—Integrated avionics system, typically including MMI but not AMC
MMI—Man machine interface
LG—Landing gear system
TOC—Top of climb
TOD—Top of descent
P—Pilot, aka on-board pilot or air pilot
PIC—Pilot in command
RA—Radio altimeter
RP—Remote pilot, aka ground pilot
PMS—pilot-in-command Mode Selector
NAV—Navigation or navigation display
SOP—Standard of operation, for flight crew
TCA—Traffic collision avoidance
TS—Touch screen Certain embodiments of the present invention seek to provide a system including some or all of: aircraft, ground station, communication and aircraft piloting method, to enable single pilot aircraft, to perform long (private or chartered) flights, such as intercontinental flights.

Certain embodiments of the present invention seek to provide a ground system operative to support, via a conventional air-ground communication link, a FAR-23 aircraft performing a long (private or chartered) flight carrying a small number of passengers such as one, two, three or four passengers.

Certain embodiments of the present invention seek to provide a system including some or all of: aircraft, ground station, communication and aircraft piloting method, to enable FAR-23 aircraft, rather than FAR-25 aircraft whose operation costs are much higher, to perform long (private or chartered) flights, such as intercontinental flights, carrying a small number of passengers such as one, two, three or four passengers.

Certain embodiments of the present invention seek to provide an aircraft, and aircraft flight method, in which aircraft control alternates, or flips back and forth, between an (a single) air pilot and a remote pilot, and wherein, for at least a portion of the aircraft's cruise time when aircraft systems and communication are in normal mode (no major failure), aircraft control is in the hands of a remote pilot rather than an airborne pilot, however, as opposed to proposed pilotless flights, an air pilot is on board to:

(a) take or retrieve aircraft control for some or all of the following possible flight phases: takeoff, the aircraft's ascent phase, descent phase, land, emergency operation and piloting over geographic regions which may forbid aircraft control by ground-pilot; and (b) turn over or restore aircraft control to the remote pilot, when some or each of the above phases terminate.

Certain embodiments of the present invention seek to provide a flight method with hybrid or intermittent piloting phases: one phase of "pilotless" operation, used during the easy, more mature cruise phase, in which a remote pilot controls the aircraft, and another piloted phase, including the complicated higher risk takeoff depart approach and land operations.

Due to weight limitations of FAR-23 aircraft, FAR-25 aircraft are normally used for intercontinental transportation of passengers.

Advantages of certain embodiments include:

advantageously combining the advantages, of conventional piloted flight (at the more complex and higher risk phase of flight) with the advantages, e.g. low cost, of contemplated remote pilot flight (during the less complex, low risk, long cruising phase);

longer flight duration and ranges for small aircraft such as FAR-23 aircraft, or even utilization of cruise time by airborne pilots for other tasks, such as preparing for business meetings, for a pilot flying himself on a business trip, or operating a mission payload, for special mission flights; long flights include intercontinental flights and typically involve 8 or more flight-hours.

the conventional presence of 2 pilots significantly impedes design of a small FAR-23 aircraft able to fly intercontinentally Since the presence of 2 pilots "uses up" a high proportion of the available payload weight allocation.

The FAR-25 need for a minimum crew of only 2 pilots impacts operation cost significantly as for long (>8 hr) commercial flights 3 or more pilots are required.

Certain embodiments of the present invention seek to provide a Cockpit including pilot seat which enable two modes of pilot functioning: a. actively piloting the aircraft; and b. resting comfortably while avoiding unintentional control input to aircraft systems.

Certain embodiments of the invention seek to provide a cockpit for a single pilot only thereby to reduce at least one of aircraft size e.g. cockpit width, weight, drag and cost.

Certain embodiments of the present invention seek to provide an on-board pilot man machine interface operative to transfer aircraft control intermittently at least from onboard pilot-in-command mode to remote pilot-in-command mode and vice versa; to enter a neutralized state or "sleep" state while the pilot is at rest, in which the interface refrains from accepting (unintentional) control inputs from the pilot, and to provide air-ground synchronization in which controls executed from ground are presented on-board and vice versa.

Pilot-in-command mode selecting logic and controls may be provided to enable at least one of the ground or air pilots to request control of the aircraft and to receive same from their man machine interface.

According to certain embodiments, transition logic is provided, according to which an instructor pilot on the ground may always grab control, even without consent on the part of the air pilot P.

According to certain embodiments, transition logic is provided, according to which, in case of certain failure conditions, the pilot in command is automatic, not human, e.g. as described herein and transition from this state to pilot-in-command=air pilot, occurs only if and when the air pilot expresses consent.

There is thus provided, in accordance with at least one embodiment of the present invention, The present invention typically includes at least the following embodiments:

Embodiment 1. An aviation method comprising performing a single-pilot flight of inter-continental duration $T>tp$, e.g. using a FAR-23 aircraft, where tp=predetermined single-pilot maximal single pilot flight duration; said performing including: using pilot-in-command logic in a processor to empower a single human airborne pilot, aboard the aircraft, to pilot the aircraft, via an airborne man-machine interface (MMI), only for a time window $W<tp$, where W includes at least an initial climbing phase of duration t1 and a final descent phase of duration t3; and using pilot-in-command logic in a processor to pilot the aircraft during an intermediate cruising phase occurring between the initial climbing phase and the final descent phase, without recourse to the human airborne pilot except during an emergency, thereby to accomplish a single-pilot inter-continental flight of duration $T>tp$, while utilizing the human airborne pilot only for a time period $W<tp$.

Embodiment 2. A method according to any of the preceding embodiments and also comprising an on-board high-reliability processor operative when in operational mode to determine whether the aircraft at each given point in time, is being controlled by the airborne man-machine interface (MMI), a human pilot on the ground via a ground-MMI, or an airborne aircraft-management computer.

Embodiment 3. A method according to any of the preceding embodiments wherein the FAR-23 aircraft has a single-seat cockpit, thereby to enable reduced fuel consumption by enabling reduced weight and/or length and/or width of the aircraft.

Embodiment 4. A method according to any of the preceding embodiments and wherein the processor is operative, when in operational mode, to determine that the factor controlling the aircraft is the ground MMI, only responsive to a request to that effect by the airborne pilot followed by an acceptance signal from the ground-MMI and only while aircraft/ground MMI communication is deemed operative.

Embodiment 5. A method according to any of the preceding embodiments and also comprising an airborne switch accessible to the airborne pilot which feeds to the processor and which, upon manipulation by the airborne pilot, momentarily assumes a pilot-selected one of three possible switch positions respectively corresponding to: airborne man-machine interface (MMI) ground-MMI, and ground-MMI with airborne MMI at rest mode which, upon cessation of the manipulation, returns to a fourth, switch-at-rest position.

Embodiment 6. A method according to any of the preceding embodiments wherein the on-board high-reliability processor has a training mode, activated by an airborne switch, and wherein the on-board high-reliability processor is operative when in training mode to determine that the factor controlling the aircraft is the MMI on the ground, responsive to a request to that effect only by the pilot on the ground, thereby to facilitate training.

Embodiment 7. A method according to any of the preceding embodiments wherein the aircraft has a single-pilot cockpit and wherein the training mode allows training sessions of the airborne pilot by an instructor pilot on the ground.

Embodiment 8. A method according to any of the preceding embodiments and wherein the processor is operative when in operational mode to determine that the factor controlling the FAR-23 aircraft is the airborne man-machine interface (MMI) responsive to a request to that effect by the airborne pilot.

Embodiment 9. A method according to any of the preceding embodiments and wherein the processor is operative, when in operational mode, to determine that if aircraft/ground MMI communication is deemed to be inoperative while the airborne aircraft management computer is controlling the FAR-23 aircraft, the airborne aircraft management computer will continue to control the aircraft, unless and until the airborne pilot requests otherwise.

Embodiment 10. A method according to any of the preceding embodiments wherein the airborne pilot is seated on a seat having a first, upright position enabling the airborne pilot to interact with the airborne MMI, and a second, reclining position.

Embodiment 11. A method according to any of the preceding embodiments and wherein the seat adopts the first position during time window W and adopts the second position during the intermediate cruising phase upon request by the airborne pilot.

Embodiment 12. A method according to any of the preceding embodiments wherein the seat reverts from the second position to the first, upright position if aircraft/ground MMI communication is interrupted.

Embodiment 13. A method according to any of the preceding embodiments and also comprising an airborne high-reliability switch accessible to the airborne pilot which feeds to the processor and which upon manipulation by the airborne pilot momentarily assumes a pilot-selected one of three possible switch positions respectively corresponding to: airborne man-machine interface (MMI), ground-MMI, and ground-MMI with airborne MMI at rest mode wherein the airborne MMI is in an inoperative mode, which does not accept inputs from a first time-point at which the airborne pilot selects a position other than the airborne man-machine position and until a second later time-point at which the airborne pilot selects the airborne man-machine interface position, thereby to prevent inadvertent operation of the airborne MMI while the airborne pilot is at rest.

Embodiment 14. A method according to any of the preceding embodiments wherein the airborne MMI feeds airborne pilot-generated commands to the high-reliability processor which is operative to implement the commands, to transmit data, based at least partly on at least one of said commands to the ground MMI, to receive remote pilot-generated commands from the ground MMI, and to implement the remote pilot-generated commands if the factor controlling the FAR-23 aircraft is the ground-MMI.

Embodiment 15. A method according to any of the preceding embodiments wherein if the aircraft is being controlled from the ground and aircraft-ground communication is determined to have been lost, pilot-in-command mode transitions from ground to airborne pilot in two states: first from ground to automatic, and only subsequently, responsive to action by the airborne pilot, from automatic to airborne pilot.

Embodiment 16. A method according to any of the preceding embodiments wherein the upright pilot seat position is employed when the aircraft is being controlled by the airborne pilot, the reclining pilot seat position is employed when the aircraft is being controlled from the ground, and when the aircraft is being controlled via an emergency/automatic pilot-in-command mode, the pilot seat, if in its reclining position, automatically reverts to its upright position.

Embodiment 17. A method according to any of the preceding embodiments wherein if an emergency is detected rendering air-pilot control of a currently air-pilot controlled aircraft ineffective, pilot-in-control responsibility for the aircraft transitions from the air to the ground in two stages including:
a first stage in which upon detection of the emergency, aircraft control automatically transitions to an aircraft management computer, and
a second stage in which upon detection of a pre-defined remote pilot input, aircraft control automatically transitions from the aircraft management computer to the remote pilot.

Embodiment 18. A computer program product, comprising a non-transitory tangible computer readable medium having computer readable program code embodied therein, said computer readable program code adapted to be executed to implement an aviation method, said method comprising the following operations:
while performing a single-pilot flight of inter-continental duration T>tp, e.g. using a FAR-23 aircraft, where tp=predetermined single-pilot maximal single pilot flight duration:
using pilot-in-command logic to empower a single human airborne pilot, aboard the aircraft, to pilot the aircraft, via an airborne man-machine interface (MMI), only for a time window W<tp, where W includes at least an initial climbing phase of duration t1 and a final descent phase of duration t3; and
using pilot-in-command logic to pilot the aircraft during an intermediate cruising phase occurring between the initial climbing phase and the final descent phase, without recourse to the human pilot except during an emergency,
thereby to accomplish a single-pilot inter-continental flight of duration T>tp, with recourse to the human pilot only for a time period W<tp.

Embodiment 19. A method according to any of the preceding embodiments wherein said flight of inter-continental duration comprises an inter-continental flight.

Embodiment 20. An aircraft system comprising:
a single pilot cockpit; and
an aircraft management computer (AMC) controlled by an On-board Pilot Man Machine Interface (MMI) in the cockpit and configured, using a processor, to: (a) transfer aircraft control intermittently between onboard piloting mode (pilot-in-command=airborne pilot), remote piloting mode (pilot-in-command=remote pilot) and automatic pilot-in-command mode; (b) to transition between a first operational state in which control inputs from the pilot are accepted, and a second neutralized state ("sleep" state), in which (unintentional) control inputs from the pilot are not accepted, and (c) to provide air-ground synchronization in which controls executed from ground are presented on-board and vice versa;
wherein when the remote pilot is in command and the aircraft management computer detects loss of uplink communication, the aircraft management computer automatically reverts to automatic pilot-in-command mode, until such time as the air pilot actively assumes command.

Embodiment 21. A system according to any of the preceding embodiments and also comprising a ground station manned by the remote pilot and having a MMI synchronized to the aircraft's MMI and wherein synchronization provided employs synchronization technology used to synchronize a plurality of redundant avionics systems manned by a plurality of airborne pilots respectively.

Embodiment 22. A system according to any of the preceding embodiments and also comprising a pilot-sensible warning provider in the cockpit, wherein the MMI is operative to detect at least one emergency situation, including loss of aircraft-ground communication and responsively, to activate the warning provider.

Embodiment 23. A system according to any of the preceding embodiments and also comprising a switch in the cockpit which enables the on-board pilot to request control responsive to which the MMI transfers control to onboard piloting mode.

Embodiment 24. A method according to any of the preceding embodiments wherein tp is a single pilot flight time duration determined by commercial (FAR-135) flight regulations.

Embodiment 25. A method according to any of the preceding embodiments wherein tp is a single pilot flight duration determined by private (FAR-91) flight regulations.

Embodiment 26. A method according to any of the preceding embodiments wherein tp is a shortest single pilot flight duration from among several such durations defined for each of several respective geographic regions along the aircraft's route.

Embodiment 27. An aviation method comprising:

performing a single-pilot flight of inter-continental duration T>tp, e.g. using a long flight duration transport aircraft, where tp=predetermined single-pilot maximal single pilot flight duration;

said performing including:

using pilot-in-command logic in a processor to empower a single human airborne pilot, aboard the aircraft, to pilot the aircraft, via an airborne man-machine interface (MMI), only for a time window W<tp, where W includes at least an initial climbing phase of duration t1 and a final descent phase of duration t3; and using pilot-in-command logic in a processor to pilot the aircraft during an intermediate cruising phase occurring between the initial climbing phase and the final descent phase, without recourse to the human airborne pilot except during an emergency, thereby to accomplish a single-pilot inter-continental flight of duration T>tp, while utilizing the human airborne pilot only for a time period W<tp.

Embodiment 28. A method according to any of the preceding embodiments wherein the long flight duration transport aircraft has a single-seat cockpit, thereby to enable reduced fuel consumption by enabling reduced weight and/or length and/or width of the aircraft.

Also provided, excluding signals, is a computer program comprising computer program code for performing any of the methods shown and described herein when said program is run on at least one computer; and a computer program product, comprising a typically non-transitory computer-usable or -readable medium e.g. non-transitory computer-usable or -readable storage medium, typically tangible, having a computer readable program code embodied therein, said computer readable program code adapted to be executed to implement any or all of the methods shown and described herein. The operations in accordance with the teachings herein may be performed by at least one computer specially constructed for the desired purposes or general purpose computer specially configured for the desired purpose by at least one computer program stored in a typically non-transitory computer readable storage medium. The term "non-transitory" is used herein to exclude transitory, propagating signals or waves, but to otherwise include any volatile or non-volatile computer memory technology suitable to the application.

Any suitable processor/s, display and input devices may be used to process, display e.g. on a computer screen or other computer output device, store, and accept information such as information used by or generated by any of the methods and apparatus shown and described herein; the above processor/s, display and input devices including computer programs, in accordance with some or all of the embodiments of the present invention. Any or all functionalities of the invention shown and described herein, such as but not limited to operations within flowcharts, may be performed by any one or more of: at least one conventional personal computer processor, workstation or other programmable device or computer or electronic computing device or processor, either general-purpose or specifically constructed, used for processing; a computer display screen and/or printer and/or speaker for displaying; machine-readable memory such as optical disks, CDROMs, DVDs, BluRays, magnetic-optical discs or other discs; RAMs, ROMs, EPROMs, EEPROMs, magnetic or optical or other cards, for storing, and keyboard or mouse for accepting. Modules shown and described herein may include any one or combination or plurality of: a server, a data processor, a memory/computer storage, a communication interface, a computer program stored in memory/computer storage.

The term "process" as used above is intended to include any type of computation or manipulation or transformation of data represented as physical, e.g. electronic, phenomena which may occur or reside e.g. within registers and/or memories of at least one computer or processor. The term processor includes a single processing unit or a plurality of distributed or remote such units.

The above devices may communicate via any conventional wired or wireless digital communication devices, e.g. via a wired or cellular telephone network or a computer network such as the Internet.

The apparatus of the present invention may include, according to certain embodiments of the invention, machine readable memory containing or otherwise storing a program of instructions which, when executed by the machine, implements some or all of the apparatus, methods, features and functionalities of the invention shown and described herein. Alternatively or in addition, the apparatus of the present invention may include, according to certain embodiments of the invention, a program as above which may be written in any conventional programming language, and optionally a machine for executing the program, such as, but not limited to, a general purpose computer which may optionally be configured or activated in accordance with the teachings of the present invention. Any of the teachings incorporated herein may, wherever suitable, operate on signals representative of physical objects or substances.

The embodiments referred to above, and other embodiments, are described in detail in the next section.

Any trademark occurring in the text or drawings is the property of its owner and occurs herein merely to explain or illustrate one example of how an embodiment of the invention may be implemented.

Unless specifically stated otherwise, as apparent from the following discussions, it is appreciated that throughout the specification discussions, utilizing terms such as, "processing", "computing", "estimating", "selecting", "ranking", "grading", "calculating", "determining", "generating", "reassessing", "classifying", "generating", "producing", "stereo-matching", "registering", "detecting", "associating", "superimposing", "obtaining" or the like, refer to the action and/or processes of at least one computer/s or computing system/s, or processor/s or similar electronic computing device/s, that manipulate and/or transform data represented as physical, such as electronic, quantities within the computing system's registers and/or memories, into other data similarly represented as physical quantities within the computing system's memories, registers or other such information storage, transmission or display devices. The term "computer" should be broadly construed to cover any kind of electronic device with data processing capabilities, including, by way of non-limiting example, personal computers, servers, computing system, communication devices, processors (e.g. digital signal processor (DSP), microcontrollers, field programmable gate array (FPGA), application specific integrated circuit (ASIC), etc.) and other electronic computing devices.

The present invention may be described, merely for clarity, in terms of terminology specific to particular programming languages, operating systems, browsers, system versions, individual products, and the like. It will be appreciated that this terminology is intended to convey general principles of operation clearly and briefly, by way of example, and is not intended to limit the scope of the invention to any particular programming language, operating system, browser, system version, or individual product.

Elements separately listed herein need not be distinct components and alternatively may be the same structure. A statement that an element or feature may exist is intended to include (a) embodiments in which the element or feature exists; (b) embodiments in which the element or feature does not exist; and (c) embodiments in which the element or feature exist selectably e.g. a user may configure or select whether the element or feature does or does not exist.

Any suitable input device, such as but not limited to a sensor, may be used to generate or otherwise provide information received by the apparatus and methods shown and described herein. Any suitable output device or display may be used to display or output information generated by the apparatus and methods shown and described herein. Any suitable processor/s may be employed to compute or generate information as described herein and/or to perform functionalities described herein and/or to implement any engine, interface or other system described herein. Any suitable computerized data storage e.g. computer memory may be used to store information received by or generated by the systems shown and described herein. Functionalities shown and described herein may be divided between a server computer and a plurality of client computers. These or any other computerized components shown and described herein may communicate between themselves via a suitable computer network.

BRIEF DESCRIPTION OF THE DRAWINGS

Certain embodiments of the present invention are illustrated in the following drawings:

FIGS. 12=13 are tables showing control and authority logic enabled by the aircraft management computer, under various piloting modes; some or all of the fields and/or records shown may be provided, according to certain embodiments

Figure 1:
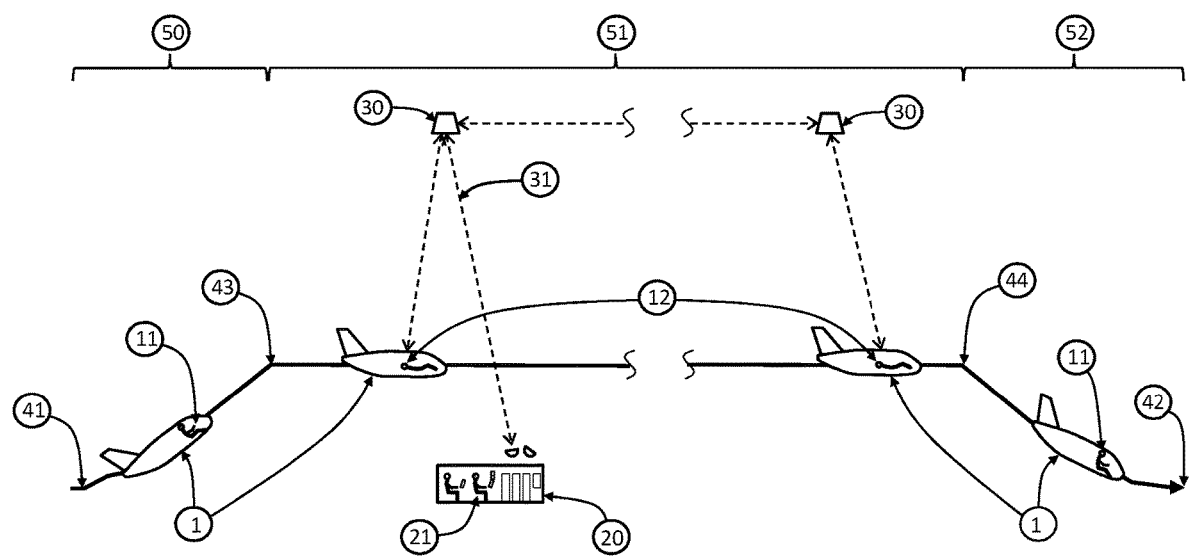
FIG. 1 is a pictorial illustration which illustrates pilot-in-command modes in different stages of flight, all as provided in accordance with certain embodiments.

Methods and systems included in the scope of the present invention may include some (e.g. any suitable subset) or all of the functional blocks shown in the specifically illustrated implementations by way of example, in any suitable order e.g. as shown.

Computational components described and illustrated herein can be implemented in various forms, for example, as hardware circuits such as but not limited to custom VLSI circuits or gate arrays or programmable hardware devices such as but not limited to FPGAs, or as software program code stored on at least one tangible or intangible computer readable medium and executable by at least one processor, or any suitable combination thereof. A specific functional component may be formed by one particular sequence of software code, or by a plurality of such, which collectively act or behave or act as described herein with reference to the functional component in question. For example, the component may be distributed over several code sequences such as but not limited to objects, procedures, functions, routines and programs and may originate from several computer files which typically operate synergistically.

Any method described herein is intended to include, within the scope of the embodiments of the present invention, also any software or computer program performing some or all of the method's operations, including a mobile application, platform or operating system e.g. as stored in a medium, as well as combining the computer program with a hardware device to perform some or all of the operations of the method.

Data can be stored on one or more tangible or intangible computer readable media stored at one or more different locations, different network nodes or different storage devices at a single node or location.

It is appreciated that any computer data storage technology, including any type of storage or memory and any type of computer components and recording media that retain digital data used for computing for an interval of time, and any type of information retention technology, may be used to store the various data provided and employed herein. Suitable computer data storage or information retention apparatus may include apparatus which is primary, secondary, tertiary or off-line; which is of any type or level or amount or category of volatility, differentiation, mutability, accessibility, addressability, capacity, performance and energy use; and which is based on any suitable technologies such as semiconductor, magnetic, optical, paper and others.

DETAILED DESCRIPTION OF CERTAIN EMBODIMENTS

According to certain embodiments, a system and method of operation is provided to enable single pilot aircraft to extend its flight duration and range beyond the practical and safe duration of private flight operation (FAR 91) and/or to overcome flight range limitations currently observed in deference to the 8 flight hour and 12 hour duty time limitations stipulated in commercial operation regulations (e.g. FAR 135).

Commercial single crew operation is limited to 8 flight hours and 12 hours duty time. Conventionally, in the case of a single pilot crew that cannot leave the controls unattended, even for short durations, the practical regular flight duration is even further limited (4 hrs or less).

Much energy is being devoted to R & D for pilotless transport aircraft. In striking contrast, there does not appear to be any existing solution for a mission that includes takeoff, climb, approach and land, in which high risk phases are entrusted to an onboard pilot, whereas the much simpler, low risk cruise phase, are under normal conditions piloted by a remote pilot. This is the case even though the cruise phase over the Atlantic is already executed automatically (auto pilot, auto throttle and automatic data link communication with ATC (air traffic controller) under normal conditions. When aircraft systems are operating normally in performing the original flight plan, the airborne pilots merely monitor, and, should abnormal conditions appear, airborne pilots act accordingly e.g. negotiate a change in the flight plan, with the air traffic controller.

According to certain embodiments, the flight comprises at least two modes of operation (FIG. 1):
(1) aircraft piloted by on-board pilot (pilot-in-command=airborne pilot); and
(2) aircraft piloted by a remote pilot on ground (pilot-in-command=remote pilot).

Typically a third mode is provided, pilot-in-command=automatic mode, to enable safe transition between the first two modes particularly under abnormal conditions; in particular, when the remote pilot is in-command and the aircraft system detects loss of uplink communication, the avionics e.g. AMC typically automatically reverts to pilot-in-command=automatic mode, until such time as the other pilot, typically the air pilot, actively assumes command (by requesting or accepting pilot-in-command=airborne pilot mode).

The automatic pilot-in-command mode may be similar to those existing today such as Heron, an IAI (Israel Aerospace Industries)-made UAV (unmanned aerial vehicle).

Typically, during cruise phase, the Aircraft Management Computer 15, when in automatic pilot-in-command mode, is operative as follows:
a. If aircraft was assigned to a flight plan route and altitude, automatic piloting mode is operative to follow the assigned flight plan, altitude and speed (e.g. the last that was confirmed by the pilot in command).
b. If aircraft was assigned to heading or other, automatic pilot-in-command mode is operative maintain assigned/last heading, altitude and speed for pre-determined time and then turn to the next way point of last confirmed flight plan route.
c. If flight plan was lost, Aircraft Management Computer 15, when in automatic piloting mode, is operative to enter hold pattern.

Typically, the Aircraft Management Computer 15, when in automatic pilot-in-command mode, has the ability to carry out an emergency landing without ILS (instrument landing system), e.g. similar to that used by IAI UAV's Heron. The Aircraft Management Computer 15, when in automatic piloting mode, typically also is confirmed for recovery from out of flight envelope scenario (as in IAI UAV's Heron) and performing emergency descent when cabin pressure is lost (as in IAI's G-280), e.g. as described in detail below The aircraft may be piloted by the on-board pilot up to top of climb (TOC) and after top of descent (TOD). When cruising, typically from TOC to TOD, the aircraft may be piloted by a remote pilot unless and until abnormal conditions warrant emergency involvement of the on-board pilot.

Referring to FIG. 1, the flight method of piloting typically comprises 3 piloting phases:
1. In the initial phase (50), the aircraft (1) is piloted by on-board pilot (11) from initialization to TOC (43—Top Of Climb). A remote pilot (21) may monitor and support the on-board pilot.
2. In the intermediate phase (51), after top of climb (TOC) and after cruise mode has been entered, aircraft piloting is transferred to the remote pilot (21) at the ground station (20). The remote pilot monitors and controls the aircraft via satellite (30) data link communication (31). The on-board pilot may release himself from duty and enter rest mode (12). Flight path may be maintained by an auto pilot and auto throttle that are controlled and/or monitored by the remote pilot. This phase comprises the major temporal portion of long flights. Time in which the pilot is resting, need not be considered flight time.

3. In the final phase (52), the aircraft piloting is transferred again to the on-board pilot. The transfer may be done usually toward top of descent (TOD) (44) and the on-board pilot may pilot the aircraft, typically until flight ends. (42). A remote pilot (21) may monitor and support the on-board pilot.

Figure 2A:
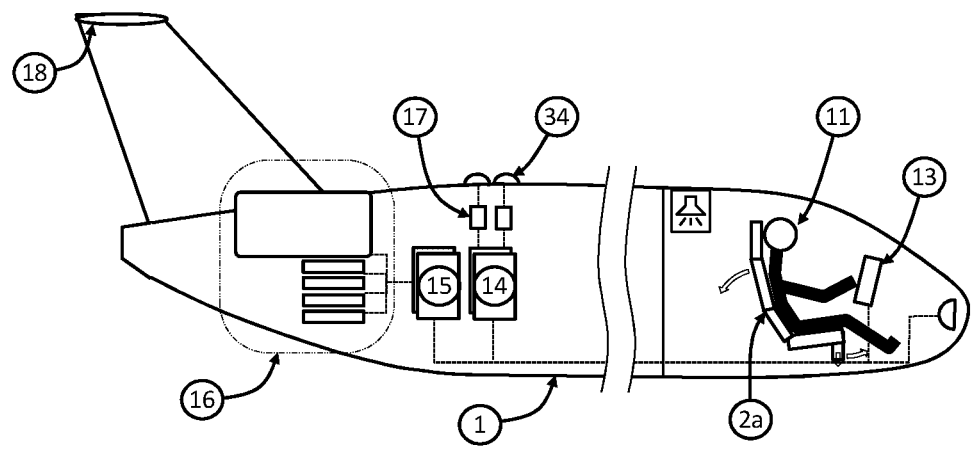
FIGS. 2a, 2b are simplified side views of an on-board pilot in a two-mode cockpit corresponding to Piloting (i.e. active) & Rest-in-Cabin piloting modes respectively, in accordance with certain embodiments.
Figure 2B:
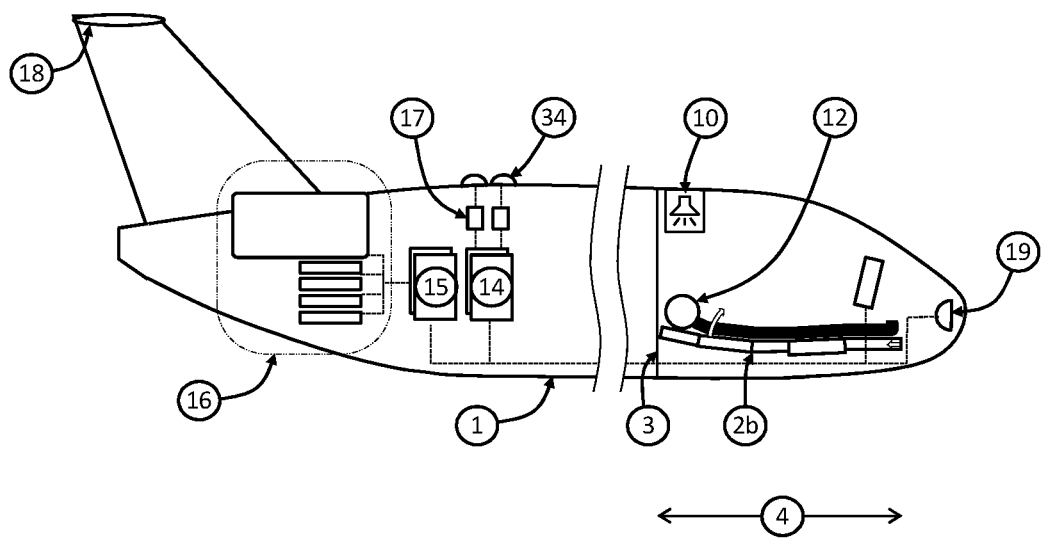

Referring to FIGS. 2a-2b, the aircraft features may include some or all of:

a. Pilot that may be on duty (11) piloting the aircraft or in rest mode (12) with a cockpit and pilot seat that enable comfortable rest and avoid unintentional control inputs to aircraft systems b. Integrated Avionics System 14 typically includes an Onboard MMI (Man Machine Interface unit) 13 enables pilots to aviate, communicate and navigate, as done on today's advanced aircrafts such as IAI G-280.

c. Aircraft Management Computer 15 enables pilot-in-command logic and emergency autonomous piloting e.g. as described herein with reference to FIGS. 11 and 12. The above capability is known in the art e.g. is implemented in state of the art aircraft such as Eclipse and Pc-24.

Typically, all monitor and control data is on a data bus to facilitate easy sharing of that data between aircraft and ground station through the communication net.

The above architecture enables an aircraft, according to certain embodiments, to receive remote pilot inputs through the data link, and to function similarly to an aircraft whose onboard pilot is pilot-in-command.

Figure 14:
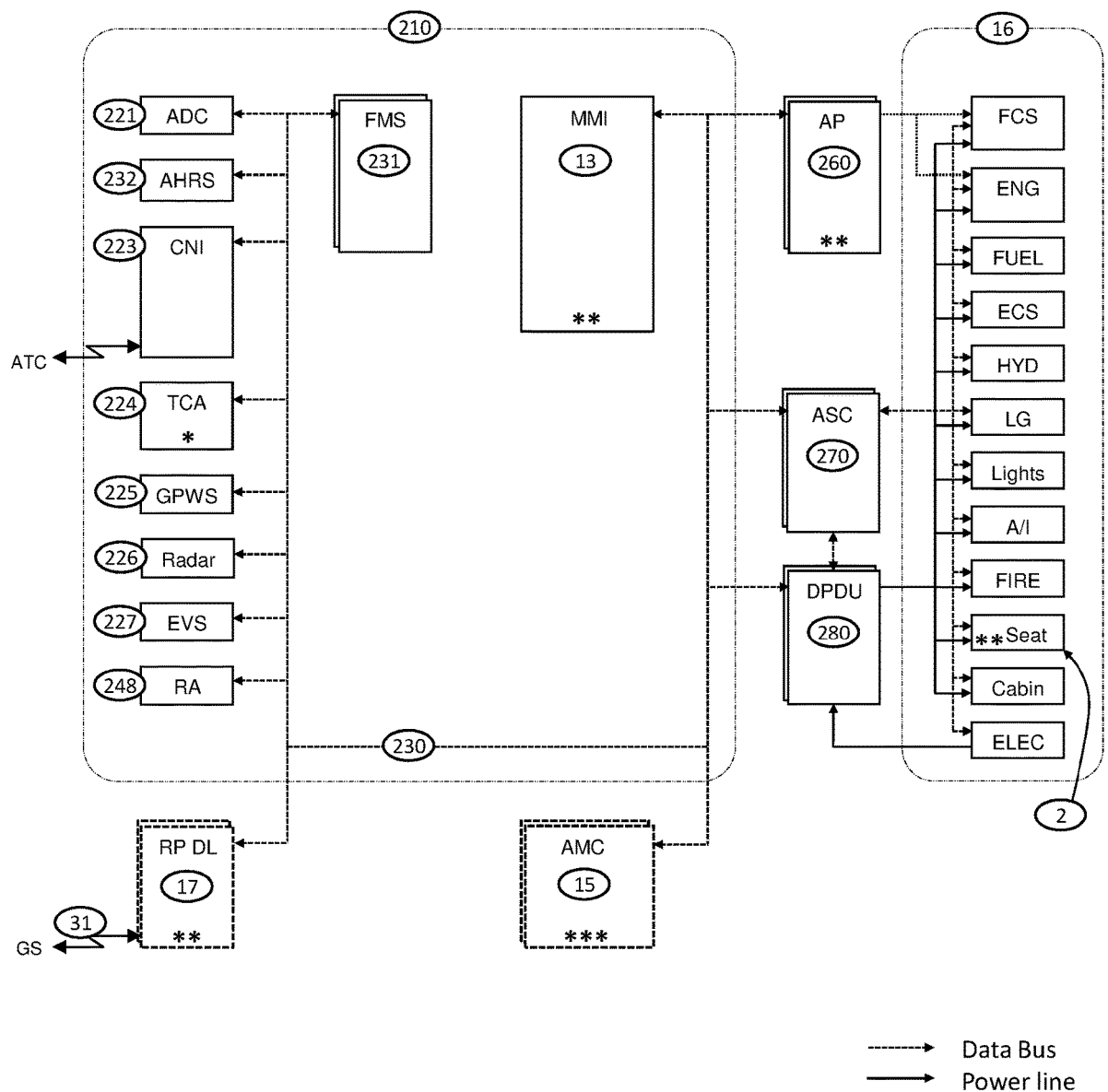
FIG. 14 is a simplified functional block diagram of aircraft systems, some or all of which may be provided in accordance with certain embodiments.

Typically, the Aircraft Management Computer 15 has automatic capability to set an initial response in critical failure scenarios, and enables dealing with such scenarios by remote pilot or autonomously, before an on-board pilot takes over the controls. For example, the initial response may be to alert the air control facility and/or all aircraft in the vicinity that the aircraft is in emergency mode, thereby to encourage all aircraft to avoid the immediate vicinity of the aircraft in emergency mode.

d. All of the aircraft non avionic systems 16 shown in FIG. 14 are typically controlled by the Aircraft Management Computer 15 e. Onboard MMI (Man Machine Interface unit) 13 that enables:

E1. Onboard pilot to execute piloting functions (as a usual aircraft) but with remote pilot monitoring of all activity from remote MMI (23).

E2. Onboard pilot monitors all remote pilot piloting activity when the remote pilot is piloting the aircraft.

E3. Eliminate unintentional inputs to the onboard MMI when the onboard pilot is resting.

To achieve E1, E2 both MMI are typically synchronized to present the same controls status at the same time. Typically, when a remote pilot is piloting the aircraft, all control actions that are executed from the ground station are presented on the aircraft onboard control panel, and vice versa: when the air pilot is piloting the aircraft, all control actions that are executed from the air are presented on the ground control panel. This may for example be implemented by:

A. AMC (Aircraft management computer) 15 e.g. as described above.

B. Using some or all of the following type of controls (switches) which facilitate synchronization between the onboard and remote MMI:

B1. "touch screen" (as in smart phones and some new aircraft control panels such as Garmin 3000 avionics and G-500 bizjet), B2. Cursor control switches that enable to control function on a display, such as that which exists in fighter aircraft and in some new BizJets such as IAI G-280.

B3. "Momentary switches" which actuate when momentarily shifted or pressed, and which, when released reverts back to neutral. Use of momentary switches in aircraft is known, such as in a Boeing overhead panel or in Avidyne avionics.

B4. "active controls" that change position in one pilot MMI when changed by the system or the other pilot. "active control" is used in some conventional Fly by wire (FBW) sticks such as F-35 and G-500/600 and in auto throttle applications as in, say, IAI G-280 and may enable suitable synchronization.

Data link communication with ground station is done by redundant SAT COM units (17) and antennas (34).

A flight control system 18, typically FBW—Fly by wire, is provided to enable the reliability required at remote piloting mode.

A DAA (Detect And Avoid) system 19 provides a suitable level of safety regarding preventing of a colliding threat with an uncooperative aircraft. The level of safety may even exceed that provided by a human airborne pilot who, when in cruise, does not search for aircrafts continually.

According to certain embodiments, two AMC's are provided, one on-board and another on the ground. According to certain embodiments, the ground station manned by the remote pilot has an MMI and optionally AMC each synchronized to the aircraft's MMI and AMC, respectively. The synchronization provided may for example employ any suitable synchronization technology used to synchronize a plurality of redundant avionics systems manned by a plurality of airborne pilots respectively.

Figure 15:
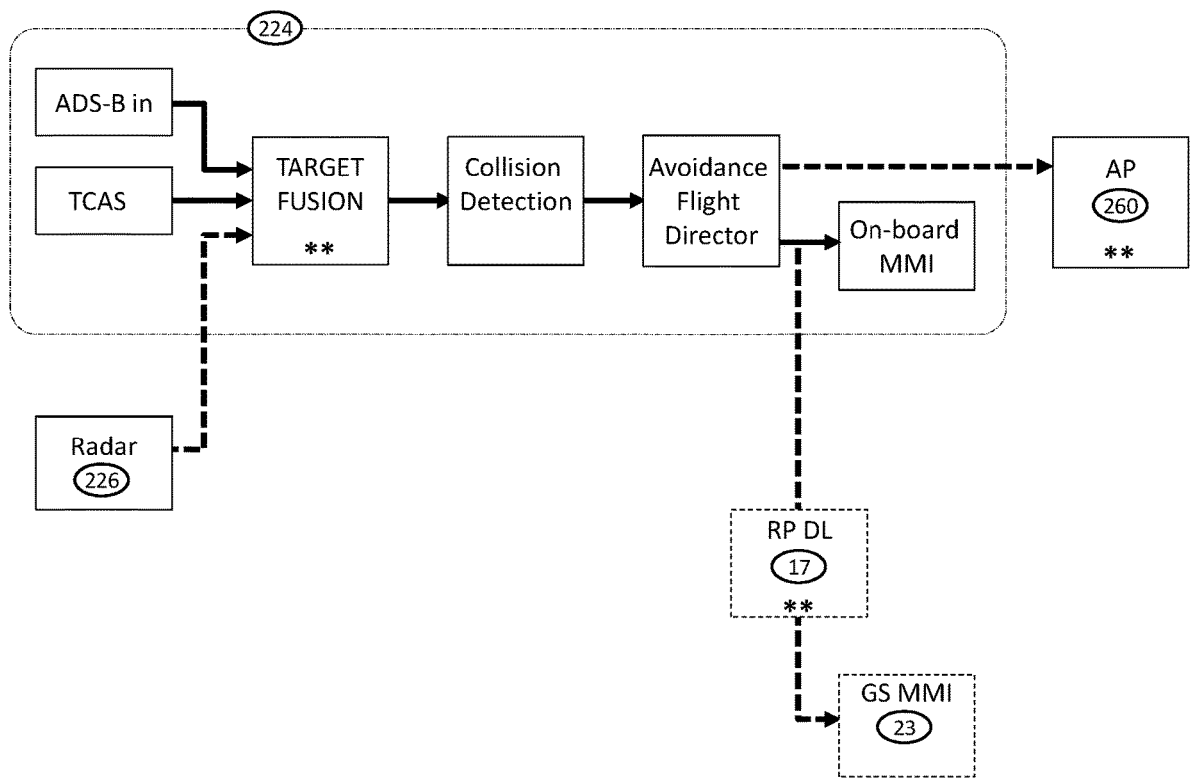
FIG. 15 is a simplified functional block diagram of DAA apparatus useful in conjunction with certain embodiments of the present invention.

FIG. 15 is a simplified functional block diagram of DAA apparatus components, some or all of which may be provided in Detect And Avoid system 19.

Detect And Avoid (DAA) functionality may be based on integration of some or all of the following components, as shown in more detail in FIG. 14:

(a) radar 226 (FIGS. 14, 15), configured to detect and track several aircrafts (e.g. Elta 3032) in at least the same range and area that a pilot could have detected.

(b) Algorithm to correlate TCAS/ADS-B 224 (e.g. L-3 T$^3$CAS) tracks with the radar tracks e.g. as done in ground air traffic surveillance systems between secondary and main radar (c) each "new" track that fails to appear on ADS-B is added to a collision avoidance process performed by TCAS/ADS-B 224 to detect collisions threats and set guidance to avoid.

(d) Auto pilot 260 may be slaved to collision avoidance guidance and execute the required maneuver.

When an on-board pilot is piloting the aircraft, systems 13 and 14, 15, 16, 18 are utilized and data link with the ground is used for monitoring of a remote pilot.

When a remote pilot is piloting the aircraft, systems 17, 34 (SAT COM and antennae), and 14, 15, 16, 18 are utilized and onboard MMI unit 13 may, if desired, enable on-board pilot to monitor and/or assist as a co-pilot conventionally does.

Switching from on-board piloting to remote piloting typically comprises an on-board piloting activating request on the control unit 150 or 155 followed by a limited time window during which the remote pilot must respond via his control unit 150 or 155 that he accepts control. If the remote pilot does not respond, the switch does not occur and instead, the air pilot remains pilot-in-command.

Switching from remote piloting to on-board piloting may for example be done by one of the following two methods:
i. Onboard pilot initiates takeover using onboard pilot's control unit 150 or 155
ii. Automatically, when uplink is lost, from the moment onboard pilot confirms via his control unit that he has taken over. If onboard pilot does not confirm, or for as long as onboard pilot fails to confirm, aircraft is piloted automatically in the $3^{rd}$ pilot-in-command mode, namely automatic, aka "safe default" mode e.g. as described in detail below.

To ensure a resting airborne pilot takes control when needed, alarm apparatus (10) is used to provide a pilot-sensible
alarm e.g. via audio, visual, vibration, movement or other.

Referring again to FIGS. 2a-2b, according to certain embodiments a dual-mode pilot seat is provided having two modes of operation: Piloting & Rest-in-Cabin (reclining).

To enable pilot rest in small aircrafts, where an additional rest cabin is not practical, the cockpit is transformed into a rest cabin for the single pilot.

Pilot seat (2a), with a design similar to business or first class transport aircraft, may have 2 positions:

(2a) Upright (seating) position that may be used in piloting (2b) reclining (bed) position that may be used in resting.

Cockpit geometry design accommodates the space needed for the seat to assume its reclining position e.g. cockpit aft frame (3) may be far enough backwards to enable (4) dimension.

The pilot seat's transition from upright position and reclining position may be controlled by electrical actuators normally operated manually by the pilot to enable her or him to transition from upright to rest and vice versa, as for controls of first and business class seats in transport aircraft. In addition, the seat may automatically revert from reclining mode back to upright mode when the system or remote pilot determine that the air pilot must be asked to retake control although he is in rest mode, e.g. as described herein.

When rest-in-cabin mode is operational, typically, Pilot MMI (13) is neutralized to avoid unintentional inputs.

To wake up pilot when needed, any or all of the following techniques may be used: Audio (10), lights, vibrations and shifting the seat from its reclining position to its upright position.

Figure 3:
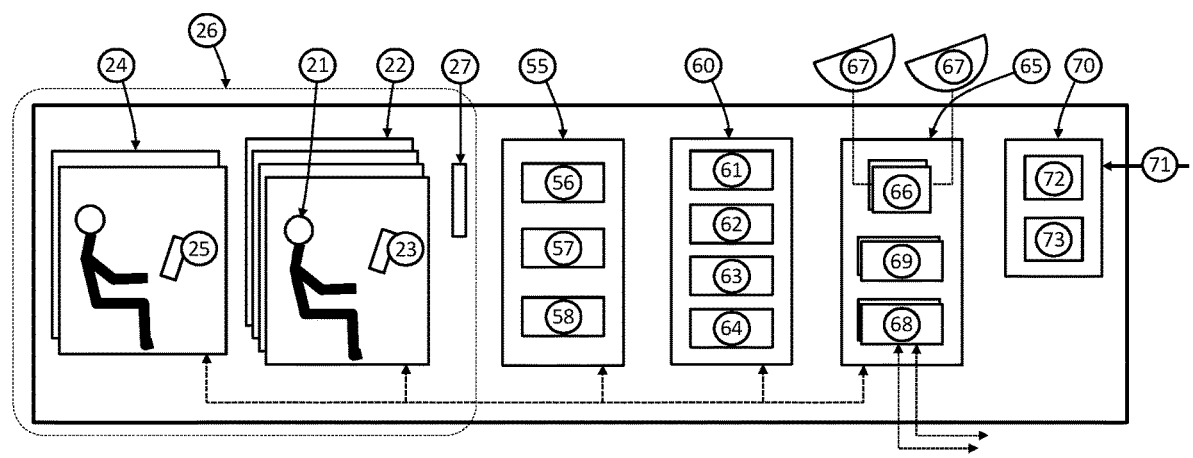
FIG. 3 is a simplified semi-pictorial semi-functional-block diagram illustration of a Remote pilot (ground) station, in accordance with certain embodiments.
Figure 6:
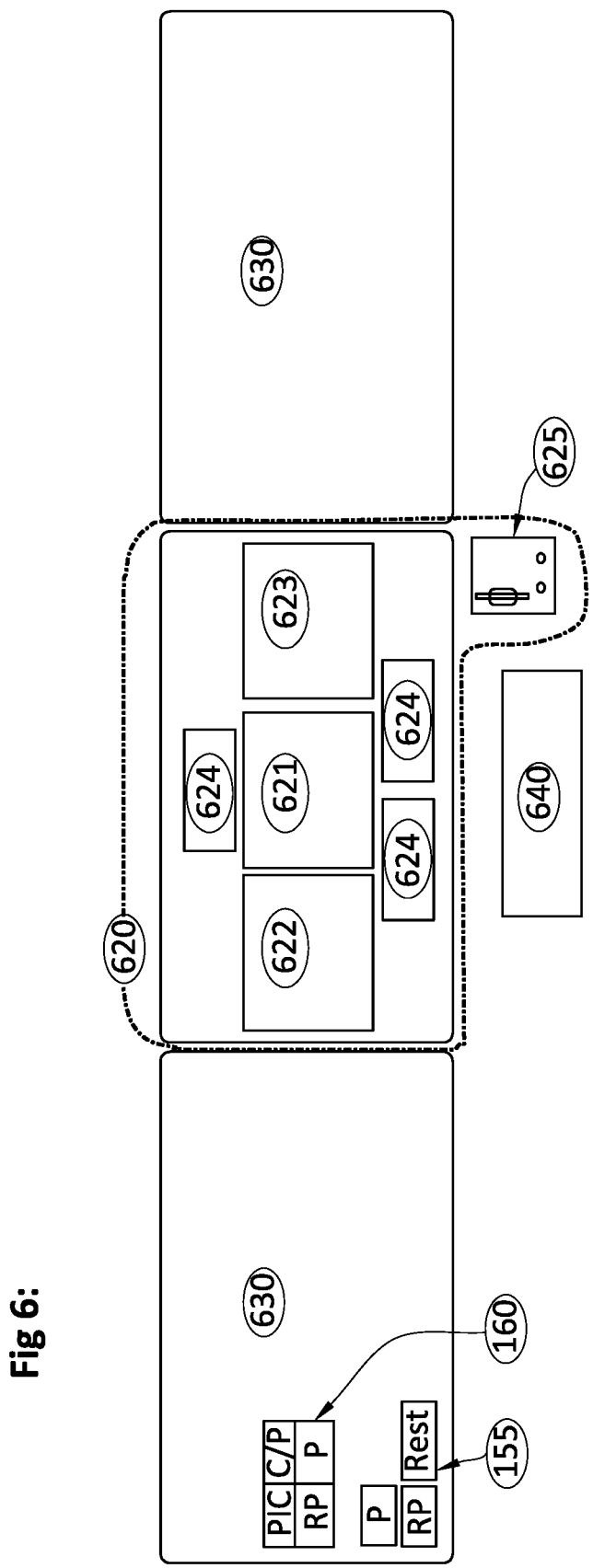
FIG. 6 is a simplified pictorial illustration of a Remote Pilot Man Machine interface operative in accordance with certain embodiments which may for example be used to implement the remote MMI 23 of FIG. 3 and is particularly suited for single aircraft piloting, including monitoring, by a remote pilot.

Referring to FIG. 3, ground station features may include some or all of:
a. Operator's work-station space (21) which includes one or several remote pilot work stations (22), which may each control a different aircraft. Each work station is equipped with remote MMI (23) that may enable monitoring and control of the aircraft e.g. as shown in FIG. 6.

Chief remote pilot and technical support work stations (24) are equipped with multi-aircraft remote MMI (25) that may be similar to remote MMI (23) but may additionally have an option to select monitoring of each of several aircraft, e.g. via remote pilot stations, to supervise or assist as needed.

b. Support software functionality (55) e.g. including processor/s and some or all of computer programs 56, 57, 58 as shown. In particular:

Planning support 56 may for example comprise software commercially available from: Collins ARINC DirectSM or Jeppesen (FliteStar) Universal on line service (UVflightplanner.com).

Operational monitoring 57 is configured to support the remote pilot by providing a remote pilot-sensible alert (audio, visual or other) generated automatically when the aircraft's actual flight path (as received directly from aircraft and/or as received from ATC tracks) shifts from the aircraft's assigned flight path. The alert is generated when expected aircraft position and/or speed values differ to at least a predetermined extent, from the actual values.

Technical monitoring software 58 is operative to automatically alert when any of predetermined aircraft system parameters exceed a pre-set limit, e.g. by comparing aircraft downlinked parameters to the pre-set limits.

d. Data base (60) typically including some or all of data repositories 61-64 as shown.

Aircraft data repository 61 stores aircraft type publications e.g. flight manual, minimum equipment list and others and may be similar to electronic flight books (EFB) used by most airlines. Aircraft maintenance records 62 stores maintenance paperless log book. Aeronautical airspace data repository 63 is available from government sources or commercial suppliers as Jeppesen (FliteDeck). PAX 64 includes passenger data e.g. identification name/information, age, gender, weight, special assistance if needed, preferences and other information.

e. Communication module (65) including SAT COM data & voice with the aircrafts (e.g. Rockwell Collins ICG NEXTLink ICS-220A) (66), and SAT antennas (67), cyber warfare module (69) to secure and check all communications and ground communications (68) e.g. for some or all of the following: aviation weather (e.g. from government sources such as ADDS), NOTAMs (Notices to Airmen from government sources), NAS (National Aviation Services) operators such as but not limited to some or all of: flight service, Automatic Terminal Information Service, or ATIS, Clearance, air ports tower, Departure, Arrival, ATC; NAS (National Aviation Services) data (e.g. aircraft track files); aircraft technical support, e.g. local maintenance, OEM (Original equipment manufacturer) support; back up ground station for redundancy; and customer service.

f. Power module (70) may for example include some or all of:
(a) connection to electrical grid 71
(b) On-line uninterruptible power supply unit 72 design to enable zero transfer time from external to internal power to back up short supply interruption (e.g. SolaHD S4KC);
(c) Autonomous generator to back up long interruptions 73.

Sufficient redundancy and/or reliability is provided to yield a similar or better level of safety relative to conventional dual pilot crew operation.

Ground station reliability typically need not be at aircraft level since if the ground station fails, the aircraft may be landed safely by the airborne pilot. The penalty might be higher workload for the airborne pilot and an alternate landing field in shorter range to comply with the airborne pilot's flight and duty time limitations. Loss of ground station is typically categorized as a major failure. To follow certification guidance, total ground station reliability exceeds $10^{-5}$ failures per hour flight.

To enable critical ground station functionality, modules (70), (65), (67) and (26) are typically based on commercially available reliable components e.g. as described above and/or suitable redundancy (e.g. autonomous power back up and redundant communications and work stations). The level of software is typically compatible e.g. as in conventional IAI UAV ground stations.

Some or all of work stations 22 in FIG. 3 may have several operation modes each, such as but not limited to:

Ground station operational Mode a; at least from takeoff to top of climb (TOC) and from top of descent (TOD) to land, which requires full attention of the remote pilot to assist and cross-check a single aircraft onboard pilot piloting.

In this mode, the remote pilot MMI may present all or most of onboard pilot MMI data and controls status.

MMI may have similar graphics as aircraft MMI and its controls are typically synchronized with the onboard MMI e.g. as described herein.

It is appreciated that this level of synchronization may be provided using known technology, because in conventional two man cockpits, each airborne pilot has his own avionics system for redundancy purposes and the two sides can be mutually synchronous; when one pilot interacts with his system via his MMI, the other pilot/s system/s can assume the same state.

Ground station operational Mode b: Emergency support of single aircraft in an emergency situation This mode typically requires full attention of the remote pilot to assist and cross check onboard pilot piloting, even if the remote (ground) pilot controls several aircraft simultaneously under normal cruising conditions.

In this mode, as in (a) above, the remote pilot MMI may present all or most of onboard pilot MMI data and controls status.

MMI may have similar graphics as aircraft MMI and its controls are typically synchronized with the onboard MMI e.g. as described herein.

Additional to remote pilot, technical specialists may have another similar type of MMI to assist in technical failures. The technical specialist may have some additional system indications and controls that are beyond the pilot's indications, to assess them in analyzing and solving any technical failure.

Ground station operational Mode c: Managing aircraft in cruise mode, in normal conditions in which no major failure has been detected, is a low workload task that enables one remote pilot to manage more than one aircraft, if desired. Mode c may be provided if it is desired for the ground pilot to simultaneously control more than one aircraft. This may be enabled by (1) presenting more than one aircraft main data required to control flight path (2) using data communication with ATC (air traffic control) that enable the remote pilot to interact with more than one ATC simultaneously and (3) reliable alert system configured to detect aircraft track shift or aircraft system failures.

Figure 4:
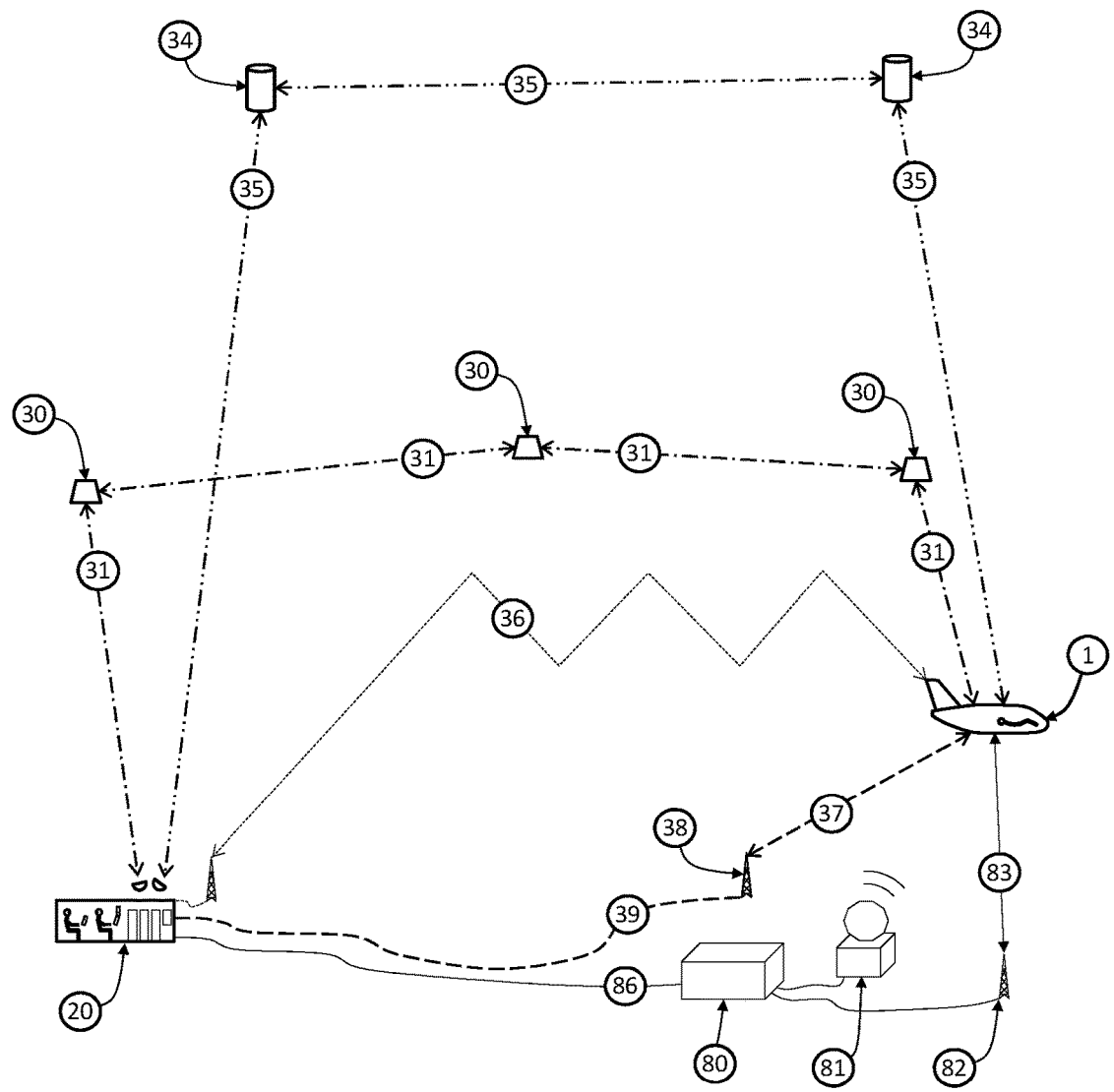
FIG. 4 is a simplified pictorial illustration of a Communication Net while at Cruise over sea or a Land Area, in accordance with certain embodiments.

Referring to FIG. 4, it is appreciated that when pilot-in-command=remote pilot, aircraft to/from ground station point to point connectivity is typically considered critical and requiring a high level of reliability. To improve reliability and to avoid generic failure, suitable safety-critical technology may be employed. For example any of, or any (redundant e.g.) combination of, the following available communication system technologies may be used:

1. Low orbit satellites (30) as Iribume service enables a system with full global coverage by using aircraft-satellite, satellite-satellite and then satellite-ground relay (31).
2. Geostatic satellite system (34) enables global coverage, except the poles, by using aircraft-satellite, satellite-satellite and satellite-ground relay (35)
3. Ground to air system (38) with a net of ground antennas (37) line connected (39) to ground station which may enable full coverage as the aircraft cruises over land, as opposed to cruising over oceans.
4. High Frequency (36) data communication which may enable limited back up over oceans. The antenna may be set at ground stations.

Additional data may be made available to the ground station through ATC (air traffic control) centers (80) and through communication lines (86). This data contains assigned "flight plan" and actual position and trend of the aircraft. ATC data is a redundant source for aircraft position and ATC-aircraft assigned flight plan. ATC data may be based on some or all of:

a) prime and secondary surveillance radars (81)
b) ADS-B that receives cooperating aircraft data link (83) through ground stations (82) or SAT COM ATC-aircraft data link or voice communication that contain assigned flight plan updates. The point to point connectivity between ground station and aircraft may be used to perform some or all of the following:

a) Send data from aircraft data buses to generate the data on the remote pilot's MMI displays.
b) Enable the remote pilot's manipulations of his controls to be sent to the aircraft enabling control of aircraft systems and to be presented on the airborne pilot's MMI.
c) Cross check of the communicated data from the multi channel types enables improving robustness, and provides immunity from unauthorized intruders
d) Send voice and data communication between ATC and aircraft and enable the remote pilot to monitor or operate ATC-aircraft negotiations ATC position and assigned flight plan may be presented on an aircraft location map (27) in the remote pilot's room in the ground station.

Figure 5A:
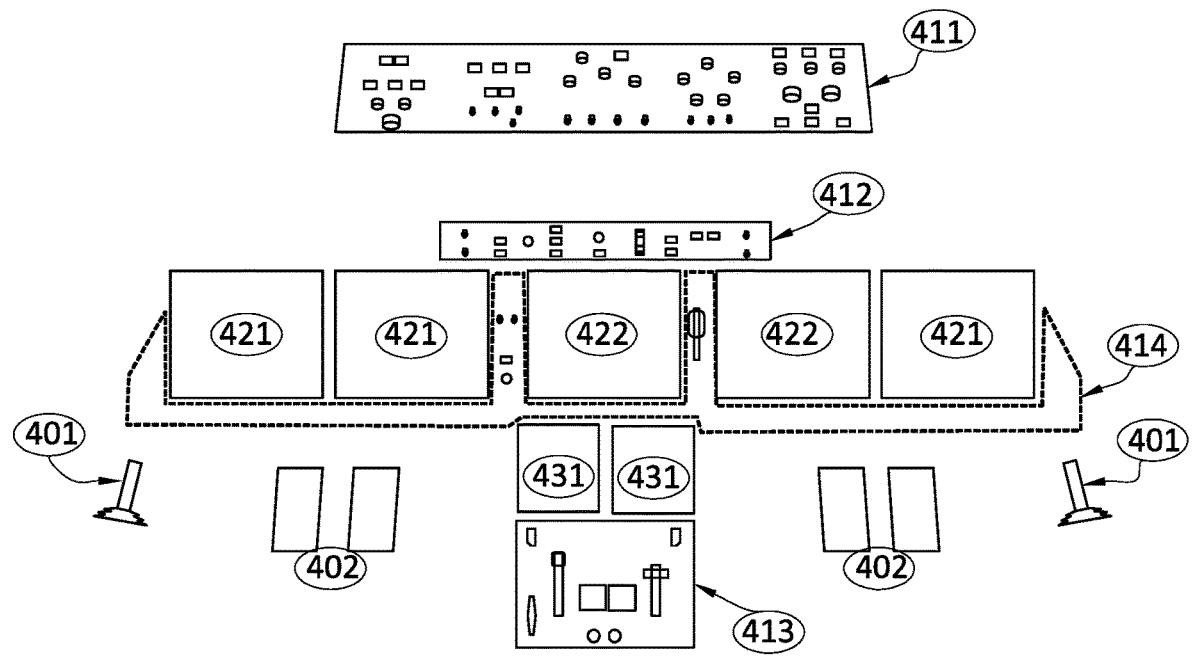
FIG. 5a is a simplified pictorial illustration of a conventional On-board Pilot Man Machine Interface (MMI) such as the MMI of the IAI Galaxy or G-280.

FIG. 5a (prior art) depicts a conventional airborne MMI similar to that which exists in most of today's aircrafts e.g. in Boeing's 777 and IAI G280.

Display information of aircraft status may be presented on any or all of displays (421-423, 431) and may be available on digital communication lines and transmitted through data link to the ground. Most state of the art transport aircraft have the option to transmit some status messages through data link e.g. via their ACARS system (preliminary capability in Boeing's B767; enhanced capability on Boeing's B777, B787 and Embraer E190).

Figure 5B:
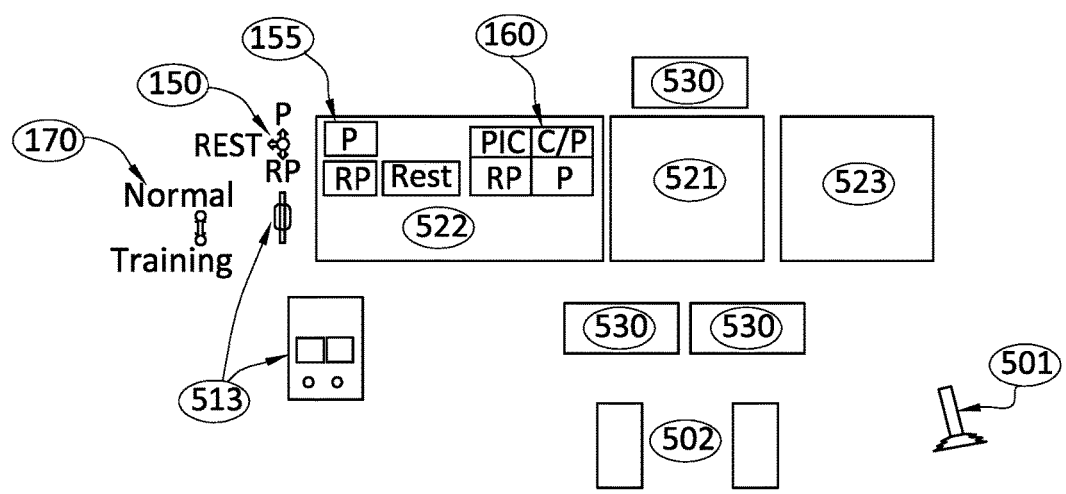
FIG. 5b is a simplified pictorial illustration of an On-board Pilot Man Machine Interface (MMI) constructed and operative in accordance with certain embodiments to perform one, some, or all of the following: (a) transfer aircraft control intermittently from onboard piloting to remote piloting and vice versa; (b) to enter a neutralized state or "sleep" state while the pilot is at rest, in which the interface refrains from accepting (unintentional) control inputs from the pilot, and (c) to provide air-ground synchronization in which controls executed from ground are presented on-board and vice versa.

The MMI of FIG. 5b, which may be used to implement airborne MMI 13 of FIG. 2a, typically provides some or all of the monitor and control function in state of the art aircraft. In the MMI of FIG. 5b, unlike that of FIG. 5a, all or most of the analog controls implementing pilot inputs to the aircraft may be replaced by touch screens to ease synchronization between, and teamwork with, a remote pilot MMI. In the embodiment of FIG. 5b, all inputs typically go through a digital computer hence are available to be sent through a data link to the ground station.

Typically the MMI is designed for a single pilot on-board. The MMI typically includes some or all of:

(524)—display and control panels that enable most of the control functions including: auto pilot, flight management system (FMS) and system controls. They may be "touch screens" and have some momentary switches that make control status easy to synchronize with remote pilot MMI.

Displays (521), (522), and (523) are displays whose control capability is via touch screens or cursor operation or momentary switches. Displays (521), (522), and (523) present primary flight display (PFD), NAV and systems status respectively.

(C3) Number of controls that control a system directly is reduced as much as possible; these controls are typically momentary-type, which enable easy synchronization with remote pilot MMI Comparing the embodiment of FIG. 5b with the prior art system of FIG. 5a:

Analog controls (411), (412), (413) and (414) in FIG. 5a e.g. knobs, push buttons and manual switches that typically control aircraft systems directly rather than through a digital computer May be difficult to synchronize reliably with the remote pilot MMI. Therefore, in the embodiment of FIG. 5b, all or most of the analog controls are typically replaced by touch screens (530) to enhance synchronization with a remote pilot MMI. In the embodiment of FIG. 5b, all inputs typically go through a digital computer hence are available to be sent through data link to the ground station.

Controls (513), (150) and (170) in the embodiment of FIG. 5b are not embedded in the touch screens. The number of controls in this group is typically as small as possible or even zero, depending e.g. on human engineering considerations; these controls are typically momentary-type, to enhance synchronization with the remote pilot MMI.

Display units (421), (422) and (423) may be arranged in different configurations than that specifically illustrated in FIG. 5a and analogously in FIG. 5b—elements 521, 522, 523 respectively—and enable a pilot to perform the following functions:

Aviate by the PFD (Pilot Flight Display) 421
Navigate with weather terrain and other traffics by ND (Nave Display) 422
Monitor and control aircraft systems status (423)

These displays may also be provided in MMI 13 (elements 521, 522, 523) and the need to duplicate displays for the benefit of a co-pilot is obviated, thereby saving space.

Flight Management System (FMS) MMI 431 includes display and controls. A plurality of such units may be provided for redundancy and may be conventionally synchronized to one another.

In the embodiment of FIG. 5b, Flight Management System (FMS) controls may be embedded in the touch screens (530) as is presented in FIG. 5b or may remain as shown in FIG. 5a Stick and pedals devices 401, 402 control primary flight control surfaces. These controls are typically provided in the embodiment of FIG. 5b as indicated by reference numerals 501, 502 respectively, but only for the onboard pilot and are not provided in the remote MMI used by the remote pilot, because typically, the remote pilot manages piloting only via auto pilot modes.

Referring to FIG. 6, Remote pilot MMI 23 of FIG. 3 may for example be similar to conventional onboard MMI and may provide some or all of the following:

1. As shown in FIG. 6, particularly for single aircraft, monitoring module (620) may be similar or identical to a conventional onboard MMI except that the other-pilot inputs that the remote pilot gets are from the air, whereas the other-pilot inputs that the air pilot gets are from the ground. The ground MMI may comprise display and other controls that present aircraft MMI status to a remote pilot and let the remote pilot operate the controls. It includes some or all of the following: display units (621), (622), (623) that present PFD, NAV and systems status.—Touch screens (624) that enable pilot inputs; and (625)—other controls not via touch screens. Element 630 typically includes displays for management and support data, such as but not limited to some or all of: forward looking video from aircraft, AFM (aircraft flight manual), MEL (minimum equipment list), aircraft maintenance log. Element (640) comprises Keyboard and other controls to operate the working station of the remote pilot.

According to certain embodiments, the air pilot and remote pilot each interact via their MMI's with their airborne (AMC) and ground avionic systems respectively, providing inputs thereto and receiving signals therefrom, and the two respective systems handshake and interact remotely with one another to achieve synchronization.

Figure 7:
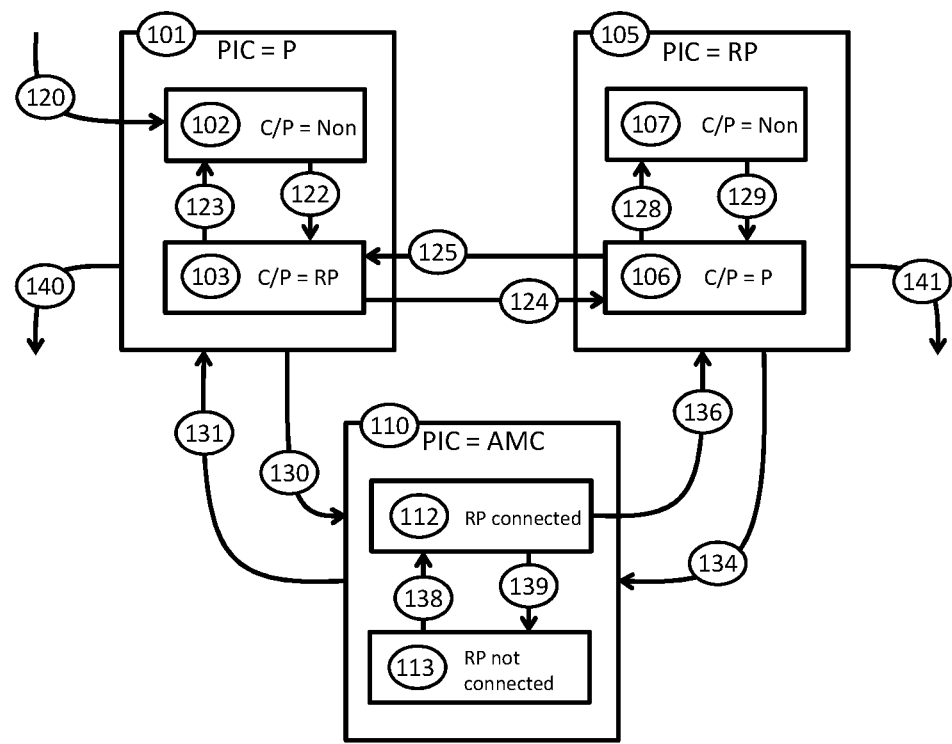
FIG. 7 is a diagram of a state machine illustrating pilot-in-command modes and transitions therebetween, constructed and operative in accordance with certain embodiments.

FIG. 7 is an example state machine which may be used as logic to govern piloting modes (also termed herein "aircraft control modes" or "pilot-in-command modes"—and method of selecting same (e.g. of transitioning between pilot-in-command modes); each state in FIG. 7 may correspond to a pilot-in-command mode or sub-mode. It is appreciated that alternatively, any suitable subset of the states (including sub-states) and/or transitions in FIG. 7 may be omitted, and any suitable states and/or transitions may be added.

As shown, in this example, the state machine includes three Pilot-in-command Modes:

(101) Onboard pilot piloting,
(105) Remote pilot piloting
(110) Automatic pilot-in-command mode for rare emergency back up.

Modes (101) and (105) each have two sub modes, in the illustrated example state chart:

other (ground/onboard) pilot monitoring and assisting the onboard/remote pilot—(103) and (106) respectively; and
without other pilot assisting (102) and (107).
In emergency mode (110) sub modes may be:
remote pilot (RP) is monitoring (112) and
remote pilot (RP) not monitoring (113).

The transitions between states may include some or all of the following, as shown in FIG. 7:

Transition (120) Activating the system is done from on-board pilot MMI. Initial default is (102) mode
Transition (122). After mode (102) has been initialized, the aircraft system may send a message to the ground station, aka GS to set two-way communication. If two-way communication is successfully established, the system transfers to mode (103).
Transition (123) At mode (103), if uplink from the ground station is lost, the system transfers to mode (102)
Transition (124) At mode (103), if onboard pilot (P) selects Piloting Mode Selector (PMS) to remote pilot (RP), and if remote pilot (RP) acknowledges in (parameter) seconds, the system transfers to mode (106).
Transition (125) At (106) mode, onboard pilot (P) may take control by moving control switch 150 or 155 to position P. Piloting may be set to P typically without remote pilot (RP) needing to confirm.
Transition (128) At (106) mode, if onboard pilot (P) moves control switch 150 or 155 to rest mode, and if remote pilot (RP) acknowledges in (PARAMETER) seconds, the system may transfer to mode (107).
Transition (129) At (107) mode, if onboard pilot (P) or remote pilot (RP) move their piloting mode selector (PMS) 150 or 155 to position P or position RP, or if aircraft CAS (crew alert system) detects a failure that requires on-board pilot awareness, the system transfers to (106) mode, Transition (130) At (101) mode, if "blue button" used by pilot (if he fears he is about to become incapacitated or by passengers that recognize that the pilot is incapacitated) is activated or if system otherwise detects that pilot is not responsive, the system transfers to (108) mode.

Automatic detection of pilot incapacity is known (United B744 for example) e.g. by monitoring pilot inputs, detecting lack of inputs for a certain time and detecting failure to respond to certain system alerts. Automatic detection of pilot incapacity by health care monitoring is also known e.g. as described in Patent document US 2013 0231582.

Transition (131) At (110) mode, if onboard pilot (P) selects Piloting Mode Selector (PMS) to P, the system transfers to mode (101)

Transition (134) At (105) mode, if uplink is lost, system transfers to (110) mode Transition (136) At (112) mode, if remote pilot (RP) selects Piloting Mode Selector (PMS) to RP, the system transfers to (105) mode Transition (138) At (113) mode, system is trying to set communication with remote pilot (RP), if uplink is received it transfers to (112) mode Transition (139) At (112) mode, if uplink is lost, system transfers to (113) mode Transition (140) At (101) mode, system may be selected to 'off' by onboard pilot (P) when on ground, not moving and engine shut down Transition (141) At (105) mode, system may be selected to 'off' by remote pilot (RP) when on ground and not moving and engine shut down It is appreciated that the state chart of FIG. 7 is provided merely by way of example. More generally, PIC transition logic may operate according to several modes e.g. some or all of the following 4 modes:

a. Mode which emphasizes avoiding non coordinated or non-authorized transition: each transition requires both pilots to select the same transition within a predetermined limited time window such as less than a minute or a couple of minutes or several minutes. In the example of FIG. 7, some or all of the following transitions may operate within this mode: (124) transition from P to RP in non-training mode, (128) transition to on-board pilot rest mode.

b. Mode which emphasizes avoiding time delay: each transition occurs immediately upon request by the pilot expressing willingness to be pilot in command (PIC), even lacking the other pilot's consent. Priority may be defined if both pilots express the same, simultaneously, e.g. the air pilot may enjoy priority over the remote pilot. In the example of FIG. 7, some or all of the following transitions may operate within this mode: (125) onboard pilot grabs the control from the remote pilot (RP). (131) onboard pilot grabs the control from automatic system. (124) RP instructor pilot grabs the controls from the onboard pilot in training mode only.

c. Mode employed when, due to difficult circumstances, neither of the human pilots are currently active as PIC: emphasize gaining immediate PIC by aircraft management computer (AMC) hence transitions occur without awaiting consent from either pilot. In the example of FIG. 7, some or all of the following transitions may operate within this mode: (130) and (134) transitions away from an onboard pilot that is confirmed as being in an incapacitation state, or away from the RP if uplink has been lost.

d. When transition is not a major safety issue and/or is not a pilot choice, transition occurs automatically. In the example of FIG. 7, some or all of the following transitions may operate within this mode: (122), (123), (139) and (138)

Typically, each transition in the system state chart operates according to a specific predetermined one of the above modes, however other implementations are possible.

According to certain embodiments, if the aircraft was being controlled by remote pilot and the aircraft management computer discerns that uplink from the ground was lost, the aircraft management computer transition the piloting mode from pilot-in-command=remote-pilot, to automatic (134) and a warning is provided, via alarm apparatus 10 (FIG. 2), to at least the air pilot. Automatic detection of lost air-ground communication is known; e.g. in UAV's; for example, if one side fails to receive from the other side an expected communication in an expected time slot for a predetermined number of communication cycles; or if an expected ack signal fails to arrive e.g. for a predetermined number of communication cycles.

Responsive to the warning, the pilot, unless incapacitated, is expected to promptly transition the pilot-in-command mode from automatic to air-controlled, in which the pilot in command is the air pilot (i.e. transition 131 from state 110 to state 101).

When aircraft is performing a transition training flight e.g. to certify a new pilot to the aircraft, the above logic may be changed by enabling an instructor remote pilot (RP) to take over controls when needed. Typically only in the training mode, a transition (124) may be provided; At (103) if remote pilot (RP) selects RP (remote pilot) on Piloting Mode Selector (PMS) 150 or 155, system transfers to mode (106).

When aircraft is operated in airspace where local regulations mandate prevention of entry to forbidden air space the above logic may be changed. For example, the logic may be changed by providing some or all of the following transitions (124; 130 and 131; other combinations):

(124) At (103) mode, if aircraft is approaching forbidden airspace, and if remote pilot (RP) selects RP on his Piloting Mode Selector (PMS) 150 or 155, system may transfer to (106) mode (130) At (101) mode, if aircraft approaches forbidden airspace, the system transfers to (110) mode.

(131) At (110) mode, only if aircraft is out of prohibited air space and if onboard pilot (P) selects Piloting Mode Selector (PMS) 150 or 155 to P, the system may transfer to (101) mode.

Figure 8:
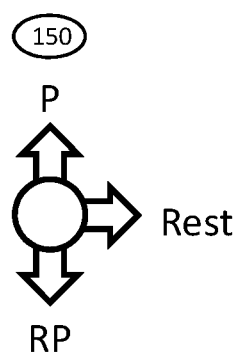
FIG. 8 is a simplified diagram of a pilot-in-command Mode Selector (PMS) switch, constructed and operative in accordance with certain embodiments.

FIG. 8 illustrates manual apparatus for selection of a Piloting/pilot-in-command mode; the apparatus may for example be incorporated into the airborne MMI of FIG. 5*b* as shown.

Pilot mode selector PMS 150 typically has a spring loaded center position.

Momentary deflection to one of the three illustrated positions other than the center, activates piloting mode selection logic in the AMC e.g. as per the state machine of FIG. 7. High-reliability implementations for this type of logic exists in state of the art aircraft, e.g. the OTTO 4way mini trim T4-0010 trim switch has high reliability and is monitored by computer. The Piloting Mode Selector (PMS) 150 is typically part of the onboard MMI and is located in a position that is protected from unintentional activation while the pilot is resting. For example, PMS 150 may be located in a position which may only be reached by the pilot when his seat is in its upright position and cannot be reached when the pilot's seat is in its reclining position.

Figure 9:
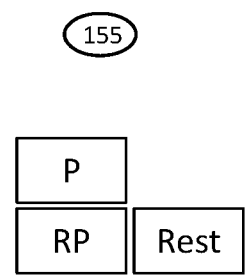
FIG. 9 is a simplified diagram of a pilot-in-command Mode Selector (PMS) digital e.g. touch screen apparatus, constructed and operative in accordance with certain embodiments.

FIG. 9 is a simplified diagram of a pilot-in-command Mode Selector 155, e.g. a touch screen or push button/s. and may serve as an alternative to apparatus 150 of FIG. 8, in which case the apparatus 150 is either omitted (e.g. in FIG. 6) or implemented in parallel for redundancy (e.g. in the system of FIG. 5b).

According to certain embodiments, switches 150, 155 allow a human operator to transition between modes of operation. Typically at least one type of PMS (150 or 155) is deployed in the cockpit and in the ground station. The logic for transitions between the states of FIG. 7 may depend on the current state, and on momentary inputs from switch 150 or 155.

It is appreciated that there are various possible switch implementations and those specifically shown and described herein are merely examples and that more generally, any suitable dedicated switch may be provided to enable pilots to define pilot-in-command modes, thereby to provide input to the system logic described herein. For redundancy purposes, the apparatus of FIG. 8 and that of FIG. 9 may both be provided in the cockpit, and/or may both be provided on the ground. Alternatively, one of the devices may be provided in the cockpit (e.g. the switch 150 which being manual might be easier for an on-board pilot in distress to operate) and one may be provided on the ground (e.g. touch screen 155, due to the remoteness of the ground station vis a vis the aircraft).

Pilot mode selector (155) may be a push button with display logic or graphics on onboard pilot (P) & remote pilot (RP) MMI displays which may or may not comprise a touch screen enabling the air pilot to select pilot mode by touch. Pilot mode selector (155) presents the current piloting mode and enables remote pilot (RP) mode selection.

According to certain embodiments, the selector 150 or 155 communicates with the aircraft management computer (15), which uses suitable logic e.g. as per the state machine of FIG. 7, to determine the governing piloting mode (e.g. air, ground, auto-pilot) at any given moment.

Figure 10:
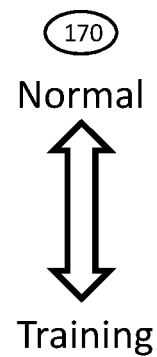
FIG. 10 is a simplified diagram of a Training Mode Selector (TMS) Switch, constructed and operative in accordance with certain embodiments in which an instructor pilot on the ground is training an airborne pilot.

FIG. 10 illustrates a switch 170 for training mode selection which may for example be incorporated into the airborne MMI of FIG. 5b as shown.

It is appreciated that the aircraft may have a single-pilot cockpit To enable safe transition training sessions of a new pilot on the type of aircraft without instructor pilot onboard, a training mode can be used. In this mode an instructor senior pilot will be assigned as remote pilot. When this mode is operational, the logic is typically that the instructor ("senior") remote pilot typically may grab control from the air pilot in the event of an unsafe evolving scenario without the air pilot's consent.

Switch 170 determines whether the pilot in command transition logic operates in normal mode or in training mode. Training mode typically differs from normal mode only in that the remote pilot instructor may grab control e.g. may immediately transition from onboard pilot in command to remote pilot in command (transition 125 in FIG. 7) using his ground-deployed pilot mode switch 155, without requiring onboard pilot trainee confirmation.

Figure 11A:
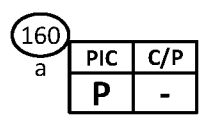
FIGS. 11a-11e are simplified diagrams of a Piloting Mode Display in 5 respective states, constructed and operative in accordance with certain embodiments.
Figure 11B:
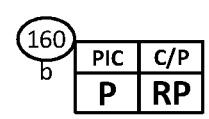
Figure 11C:
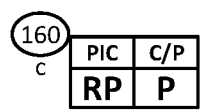
Figure 11D:
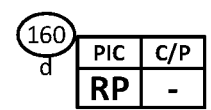
Figure 11E:
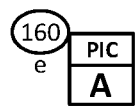

The system status may be suitably displayed, both in the cockpit and in the ground station, e.g. as shown in FIGS. 11a-11e. Typically, the display of FIGS. 11a-11e indicates whether the pilot in command is the air pilot or the ground pilot, and also indicates the identity (air pilot or ground pilot) of the current co-pilot, if any. FIGS. 11a and 11d are for single pilot operation (where pilot in command is the air pilot and the remote pilot, respectively); FIGS. 11b and 11c correspond to dual pilot operation (where pilot in command is the air pilot and the remote pilot, respectively and the co-pilot is the remote pilot and the air pilot, respectively); and FIG. 11e corresponds to autonomous operation in which neither pilot is active (element 110 in FIG. 7).

FIG. 12 is a table showing distribution of responsibilities between airborne and remote pilots, according to certain embodiments of the invention. The table of FIG. 12 may be used to improve or automate team work of airborne and remote pilots e.g. when both are active (one as pilot in command, and the other for monitoring and support).

Example logic for control and authority distribution between pilots may be as follows, and may replace or augment conventional Standard Operation Procedures (SOP) defining teamwork between pilots.

As described herein, the hardware typically includes an apparatus for defining a pilot in command (PIC) including:

(a) a typically momentary control switch (150 or 155) by which the air pilot and optionally the ground pilot may request transitions between pilot in command (PIC) states; and (b) logic, e.g. as shown in FIG. 7, defining transitions between the states as a function, inter alia, of transition requests expressed by pilot/s e.g. using their switch.

Typically, when both pilots (the airborne and ground pilots, respectively P & RP) are active exclusively, the PIC has operational controls for some critical tasks e.g. as shown in the table of FIG. 12. Other tasks may typically be done by either or both pilots to enable the other pilot to assist the PIC in a high workload scenario. One advantage of the embodiment of FIG. 12 is that inappropriate mutual pilot interference is prevented, unlike conventional dual pilot cockpits, in which only human pilot coordination prevents inappropriate mutual pilot interference.

Regarding superscript 1 in the table of FIG. 12, according to certain embodiments, both pilots (PIC and non-PIC) may manage air traffic control and aircraft communications by voice or data link.

Regarding superscript 2 in the table of FIG. 12, according to certain embodiments, in an autonomous mode, the aircraft only broadcasts its status and flight plan by data link.

Regarding superscript 3 in the table of FIG. 12, according to certain embodiments, Pilot (P) may control aircraft flight path directly through stick and throttle or by managing auto pilot and auto throttle.

Regarding superscript 4 in the table of FIG. 12, according to certain embodiments, Remote Pilot (RP) and aircraft management computer (AMC) may control the flight path only by managing the auto pilot and auto throttle.

Regarding superscript 5 in the table of FIG. 12, according to certain embodiments, lateral and vertical navigation may be programmed by both pilots, but the pilot in command must confirm the navigation before execution thereof.

Regarding superscript 6 in the table of FIG. 12, according to certain embodiments, Pilot may control all systems options. Remote pilot might be limited from doing some critical actions (as engine shut down) and in auto management mode only actions that require an immediate response are authorized. Typically similarly to existing system automation in today's modern transport aircraft (such as deploying oxygen masks upon loss of cabin pressure).

FIG. 13 is a table showing control and authority logic, according to certain embodiments, by AMC (aircraft management computer) 15, under various piloting modes.

It is appreciated that the various elements shown and described herein above may be provided separately or in any suitable combination. For example, FIG. 14 is a functional block diagram of an aircraft system which may include some or all of the illustrated elements, e.g.:

Element (210) typically comprises an integrated avionic system ("package") similar to those installed in modern aircraft such as but not limited to Garmin 3000 or Collins Fusion.

Functional blocks in avionics package 210 may include some or all of the following elements 221-228, 231 and 13:
- (221) an air data computer (ADC),
- (222) an attitude and heading reference system (AHRS),
- (223) a communication, navigation and identification module (CNI),
- (225) a ground proximity warning system (GPWS),
- (226) a weather radar; may include air to air mode
- (227) an enhanced visual system (EVS),
- (228) is a radio altimeter (RA) and
- (231) flight management system (FMS).
- (224) Traffic collision avoidance (TCA) e.g. as described above with reference to DAA functionality 19 in FIGS. 2a-2b. May include TICAS and ADS-B (e.g. L-3 $T^3CAS$); provide protection from other cooperating aircraft; and Element (13) typically comprises a Pilot man machine interface (MMI) suitably adapted to operate in conjunction with embodiments shown and described herein, e.g. as described herein with reference to FIG. 5b.

Element (17) typically comprises a SAT Data link to maintain continuous point-to-point connectivity to ground station module that enables down and up link of data, voice and control inputs between avionic busses, and the ground station. The system may be based on, say, Rockwell Collins ICG NEXTLink ICS-220A and may also include (a) secure module to prevent non-authorized element from interfering with the system (e.g. secure communication similar to any Internet communication for banking transactions)

Aircraft system control (ASC) 270 typically comprises a computer that monitors and controls the non-avionics systems 16 of FIGS. 2a, 2b and 14. ASC 270 typically also interfaces between non avionics systems and the avionics bus (230) thereby to enable monitoring and control of aircraft system through the bus. Monitoring functionality may be similar to that performed on modern advanced aircraft e.g. Collins DCU on G-280. Monitor and control through a computer may employ any suitable system architecture e.g. as ASC in Eclipse 500 by Curtiss Wright or ASC on Pc-24 by ISS.

Digital power distribution unit (DPDU) 280 typically comprises computers that enable control of the power distribution to the aircraft systems through ASC or the avionic busses, e.g. Amatec 10912 series, or Astronics 1160-4.

Element (16) typically comprises conventional aircraft non-avionic systems e.g. some or all of those shown in FIG. 14.

Element (260) typically comprises an Auto pilot e.g. similar to existing GFS-700 or Collins APS-85) typically with some or all of the following modifications:
- (a) Capability to control auto pilot modes through avionics bus (230) rather than only from dedicated auto pilot panel switches
- (b) Capability to perform collision avoidance maneuver
- (c) Emergency auto land capability on runways without ground landing instrumentation e.g. ILS. This capability is operational on IAI UAVs as Heron, and is useful e.g. to enable RP or AMC to land the aircraft in case of pilot incapacitation.

Pilot seat (2) may be as described herein with reference to FIGS. 2a-2b. Back support may be lowered and feet support may be raised to (or close to) horizontal using any suitable electrical actuation mechanism e.g. as in conventional passenger seat in first class or business class transport aircraft.

Element (15) typically comprises a aircraft management computer which may be similar to existing UAV modules e.g. the IAI Heron. AMC 15 typically includes suitable PIC logic e.g. as described herein with reference to FIG. 7 and typically enables autonomous piloting function e.g. in 2 scenarios:
- (a) to bridge short time gaps in transition from RT to P (125) when uplink was lost and P did not take over immediately; and/or
- (b) in case of incapacitation of pilot with no uplink in which case the AMC 15 may compensate for lack of air pilot and remote pilot inputs.

Typically, the aircraft management computer (15) may be configured to suitable normal condition flight path selection functionality. Normal condition flight path selection functionality may include some or all of the following functionalities:

i. If auto pilot was engaged to maintain a specific flight plan route (e.g. LNAV—lateral navigation mode), altitude, flight level change or VNAV (vertical navigation mode) and speed, then upon transition to PIC=AMC, these continue to be maintained.

ii. If speed and/or altitude were not engaged, then at the transition to PIC=MAC, AMC 15 sets auto pilot to maintain the existing altitude and/or speed. However, if altitude and/or speed are deemed unsafe, using predefined rules, AMC 15 sets a default safe altitude and/or speed, using predefined rules.

iii. If auto pilot was not engaged to maintain flight plan route (e.g. at heading mode), AMC may set auto pilot to maintain last heading for a predetermined time period (Th) (e.g. 3 minutes, or 2, or 4, or values therebetween) and then set auto-pilot to direct to the next waypoint, to follow last confirmed flight plan route.

iv. If there is no signed flight plan, AMC 15 may set auto pilot to enter hold pattern.

v. If collision avoidance system activates resolution advisory flight guidance, AMC 15 may set the auto pilot to follow that guidance. Upon back to clear from conflict status, the AMC 15 may restore auto pilot to the previous set up.

Typically, the aircraft management computer (15) may be operative to perform a suitable abnormal condition coping procedure e.g. including some or all of the following:

i. If, once a predetermined time period (Te) from the transition to PIC=AMC has elapsed (e.g. 1 minute or order of magnitude 1 minute), the AMC detects an emergency situation that requires an immediate response, using predetermined rules, the AMC 15 performs immediate actions required e.g. as defined by aircraft flight manual emergency procedures. For example, if cabin pressure declines to below a predetermined value, the AMC 15 may initiate emergency descent procedure e.g. as implemented automatically in IAI G-280.

ii. If a predetermined time window (Ti) has elapsed (e.g. 5 minutes, or 3 min, or 10 min, or values therebetween) and neither air pilot nor remote pilot have taken over, AMC 15 assumes continuous incapacitation pilot with lost uplink and operates accordingly e.g.:

resets the navigation system to land at the nearest suitable airport;

sets aircraft systems to follow descent approach, landing and after landing procedures and transmits, on ATC emergency frequency, its situation and the new rerouting.

The AMC 15 is typically able to carry out emergency landing on a runway without ILS (instrument landing system), e.g. as in IAI UAV's such as Heron.

Advantages of certain embodiments include:

(a) affordable, on demand, personal long range/international transportation by small aircraft at a fraction of cost of alternatives available today.

(b) self-piloted private flight pilot may utilize the cruise-phase time for other tasks e.g. a businessman flying himself to a business meeting may utilize the time for preparation of a meeting.

It is appreciated that the flight operation method and airborne and ground systems shown and described herein allows intercontinental flights (4000-5000 nm) for 1-4 passengers to be conducted in a manner which, it is believed, is no more risk-prone than certain existing flights, as well as other risk-prone activities tolerated by society such as automobile travel, although only a single pilot is on board. Risk to human life is small, when, as described herein, only 1-4 passengers and a single pilot are on board, on the one hand, and when the route is largely over water, rather than over populated areas, on the other hand. Also, small jets may be employed, using some or all of the aspects shown and described herein, to transport, say, 1-4 passengers from one continent to another, in such a way that the total flight length exceeds the single on-board pilot's maximal allowed hours of work (e.g. because the air-pilot, other than emergencies, is caused to be operational only for a fraction of the total flight time e.g. only during ascent and descent), and nonetheless the flight is safe. Overhead, hence cost per passenger, is greatly reduced relative to the conventional 2-pilots-on-board minimum crew option for some or all of the following reasons:

i. the second pilot, if on the ground, need not travel to another continent and back thereby reducing the duty time overhead incurred by the second pilot substantially—relative to employing a second air pilot, as is conventional, whose duty time considerably exceeds the actual flight time and who often incurs significant overnight accommodation expenses. Use of a remote e.g. on-the-ground remote pilot, rather than a second airborne pilot, may reduce 30% of the total flight cost;

ii. the 1-pilot cockpit is smaller, hence the aircraft is smaller (narrower and/or shorter; it is believed that provision of a narrower, one-pilot cockpit which may be seated more deeply within the front tip of the aircraft than a wider, 2-pilot cockpit, may reduce 80 cm from the length of the aircraft which may result in: a decrease in the total surface area of the aircraft (e.g. 5-7%) hence less drag, and less basic operation weight of the aircraft leading to reduced fuel consumption and reduced cost per distance and increased total distance for the available amount of fuel.

iii. Typically, the pilot is in his (reclining) pilot seat when off-duty, rather than out of the cockpit, thereby saving space. Enabling in-cockpit rest for the airborne (onboard) pilot also ensures ensuring that the on-board pilot at rest may be made operational within a time period comparable to or less than the time period required for an on-board pilot, flying conventionally, to return from a permitted restroom trip. Typically, all that needs to be done to cause the pilot to become fully operational, say during cruise, is some or all of the following: operate a pilot-sensible alarm triggered by the aircraft's avionic systems e.g. AMC 15, restore the pilot's seat from its reclining mode to its operational mode if relevant, and for the pilot to accept control by operating the PMS switch. Typically, the PMS switch is configured and located to avoid unintentional actuation by the pilot while he is at rest.

The operational method and system shown and described herein is advantageous because the existing need to transport a lone passenger or pairs of passengers intercontinentally is hereby met far more cost-effectively than is presently the case, perhaps as much as four-fold, given that the two-pilot aircraft conventionally used for this purpose are much larger, hence more costly. Finally, it is appreciated that the remote pilot may, if desired, operate as a co-pilot during the entire flight, devoting exclusive attention to this flight only as opposed to previous proposals for employing one remote pilot for several concurrently flying aircraft, thereby reducing certain risks relative to an aircraft whose entire crew is airborne, since airborne pilots, if incapacitated or overcome, cannot be replaced.

It is appreciated that certain embodiments shown and described herein may be safer than conventional FAR23-approved single pilot operation for the following reasons:

a. in the most critical phases of flight, take-off and landing, the onboard pilot is supported by a remote pilot who may cross check all his activities and reduce workload as if the aircraft had a two-man crew; and/or b. additional redundancy is provided, because if the onboard pilot is in stress, or in physiological failure, or in the event of technical failure, the remote pilot may support or take over safely (e.g. transition 124 in FIG. 7).

It is appreciated that each component which includes logic e.g. components 13, 14, 15, 16, 23, 25, 57, 56, 58, 60-64, 66, 69, 68 and the systems of FIGS. 5 and 7 may be implemented by one or more processors.

It is appreciated that terminology such as "mandatory", "required", "need" and "must" refer to implementation choices made within the context of a particular implementation or application described herewithin for clarity and are not intended to be limiting since in an alternative implantation, the same elements might be defined as not mandatory and not required or might even be eliminated altogether.

It is appreciated that software components of the present invention including programs and data may, if desired, be implemented in ROM (read only memory) form including CD-ROMs, EPROMs and EEPROMs, or may be stored in any other suitable typically non-transitory computer-readable medium such as but not limited to disks of various kinds, cards of various kinds and RAMs. Components described herein as software may, alternatively, be implemented wholly or partly in hardware and/or firmware, if desired, using conventional techniques, and vice-versa. Each module or component may be centralized in a single location or distributed over several locations.

Included in the scope of the present disclosure, inter alia, are electromagnetic signals in accordance with the description herein. These may carry computer-readable instructions for performing any or all of the operations of any of the methods shown and described herein, in any suitable order including simultaneous performance of suitable groups of operations as appropriate; machine-readable instructions for performing any or all of the operations of any of the methods shown and described herein, in any suitable order; program storage devices readable by machine, tangibly embodying a program of instructions executable by the machine to perform any or all of the operations of any of the methods shown and described herein, in any suitable order; a computer program product comprising a computer useable medium having computer readable program code, such as executable code, having embodied therein, and/or including computer readable program code for performing, any or all of the operations of any of the methods shown and described herein, in any suitable order; any technical effects brought about by any or all of the operations of any of the methods shown and described herein, when performed in any suitable order; any suitable apparatus or device or combination of such, programmed to perform, alone or in combination, any or all of the operations of any of the methods shown and described herein, in any suitable order; electronic devices each including at least one processor and/or cooperating input device and/or output device and operative to perform e.g. in software any operations shown and described herein; information storage devices or physical records, such as disks or hard drives, causing at least one computer or other device to be configured so as to carry out any or all of the operations of any of the methods shown and described herein, in any suitable order; at least one program pre-stored e.g. in memory or on an information network such as the Internet, before or after being downloaded, which embodies any or all of the operations of any of the methods shown and described herein, in any suitable order, and the method of uploading or downloading such, and a system including server/s and/or client/s for using such; at least one processor configured to perform any combination of the described operations or to execute any combination of the described modules; and hardware which performs any or all of the operations of any of the methods shown and described herein, in any suitable order, either alone or in conjunction with software. Any computer-readable or machine-readable media described herein is intended to include non-transitory computer- or machine-readable media.

Any computations or other forms of analysis described herein may be performed by a suitable computerized method. Any operation or functionality described herein may be wholly or partially computer-implemented e.g. by one or more processors. The invention shown and described herein may include (a) using a computerized method to identify a solution to any of the problems or for any of the objectives described herein, the solution optionally include at least one of a decision, an action, a product, a service or any other information described herein that impacts, in a positive manner, a problem or objectives described herein; and (b) outputting the solution.

The system may, if desired, be implemented as a web-based system employing software, computers, routers and telecommunications equipment as appropriate.

Any suitable deployment may be employed to provide functionalities e.g. software functionalities shown and described herein. For example, a server may store certain applications, for download to clients, which are executed at the client side, the server side serving only as a storehouse. Some or all functionalities e.g. software functionalities shown and described herein may be deployed in a cloud environment. Clients e.g. mobile communication devices such as smartphones may be operatively associated with, but external to, the cloud.

The scope of the present invention is not limited to structures and functions specifically described herein and is also intended to include devices which have the capacity to yield a structure, or perform a function, described herein, such that even though users of the device may not use the capacity, they are, if they so desire, able to modify the device to obtain the structure or function.

Features of the present invention, including operations, which are described in the context of separate embodiments may also be provided in combination in a single embodiment. For example, a system embodiment is intended to include a corresponding process embodiment and vice versa. Also, each system embodiment is intended to include a server-centered "view" or client centered "view", or "view" from any other node of the system, of the entire functionality of the system, computer-readable medium, apparatus, including only those functionalities performed at that server or client or node. Features may also be combined with features known in the art and particularly, although not limited to, those described in the Background section or in publications mentioned therein.

Conversely, features of the invention, including operations, which are described for brevity in the context of a single embodiment or in a certain order may be provided separately or in any suitable subcombination, including with features known in the art (particularly although not limited to those described in the Background section or in publications mentioned therein) or in a different order. "e.g." is used herein in the sense of a specific example which is not intended to be limiting. Each method may comprise some or all of the operations illustrated or described, suitably ordered e.g. as illustrated or described herein.

Devices, apparatus or systems shown coupled in any of the drawings may in fact be integrated into a single platform in certain embodiments or may be coupled via any appropriate wired or wireless coupling such as but not limited to optical fiber, Ethernet, Wireless LAN, HomePNA, power line communication, cell phone, PDA, Blackberry GPRS, Satellite including GPS, or other mobile delivery. It is appreciated that in the description and drawings shown and described herein, functionalities described or illustrated as systems and sub-units thereof can also be provided as methods and operations therewithin, and functionalities described or illustrated as methods and operations therewithin can also be provided as systems and sub-units thereof. The scale used to illustrate various elements in the drawings is merely exemplary and/or appropriate for clarity of presentation and is not intended to be limiting.

The invention claimed is:

1. An aircraft system comprising:
a single pilot cockpit;
an aircraft management computer (AMC) controlled by an On-board Pilot Man Machine Interface (MMI) in the cockpit and configured, using a processor, to: (a) transfer aircraft control intermittently between onboard piloting mode (pilot-in-command=airborne pilot), remote piloting mode (pilot-in-command=remote pilot) and automatic pilot-in-command mode; (b) to transition between a first operational state in which control inputs from airborne pilot are accepted, and a second neutralized state ("sleep" state), in which (unintentional) control inputs from the airborne pilot are not accepted, and (c) to provide air-ground synchronization in which controls from a remote pilot on the ground are presented on-board and vice versa; and
at least one airborne high-reliability switch accessible to the airborne pilot which feeds to the processor and which upon manipulation by the airborne pilot momentarily assumes a pilot-selected one of three possible switch positions respectively corresponding to: airborne man-machine interface (MMI), ground-MMI, and ground-MMI with airborne MMI at rest mode wherein the airborne MMI is in an inoperative mode, which does not accept inputs from a first time-point at which the airborne pilot selects a position other than the airborne man-machine position and until a second later time-point at which the airborne pilot selects the airborne man-machine interface position, thereby to prevent inadvertent operation of the airborne MMI while the airborne pilot is at rest;

wherein when the remote pilot is in-command and the aircraft management computer detects loss of uplink communication, the aircraft management computer automatically reverts to automatic pilot-in-command mode, until such time as the air pilot actively assumes command.

2. The system according to claim 1, further comprising a ground station manned by the remote pilot and having an MMI synchronized to the aircraft's MMI and wherein synchronization provided employs synchronization technology used to synchronize a plurality of redundant avionics systems manned by a plurality of airborne pilots respectively.

3. The system according to claim 1, further comprising a pilot-sensible warning provider in the cockpit, wherein the MMI is operative to detect at least one emergency situation, including loss of aircraft-ground communication and responsively, to activate the warning provider.

4. The system according to claim 1, further comprising a switch in the cockpit which enables the on-board pilot to request control responsive to which the MMI transfers control to onboard piloting mode.

5. The system according to claim 1, wherein switching from remote piloting to on-board piloting is effected by the airborne pilot initiating takeover using at least one onboard pilot's control unit.

6. The system according to claim 1, wherein switching from remote piloting to on-board piloting is effected automatically, when uplink is lost, from the moment the airborne pilot confirms via his control unit that he has taken over.

7. The system according to claim 6 wherein for as long as the airborne pilot does not confirm, the aircraft system is piloted automatically in a pilot-in-command mode which is automatic.

8. An aircraft operation method comprising:

Providing an aircraft management computer (AMC) controlled by an On-board Pilot Man Machine Interface (MMI) in a single pilot cockpit and configured, using a processor, to:

(a) transfer aircraft control intermittently between onboard piloting mode (pilot-in-command=airborne pilot), remote piloting mode (pilot-in-command=remote pilot) and automatic pilot-in-command mode;

(b) to transition between a first operational state in which control inputs from airborne pilot are accepted, and a second neutralized state ("sleep" state), in which (unintentional) control inputs from the airborne pilot are not accepted, and (c) to provide air-ground synchronization in which controls from a remote pilot on the ground are presented on-board and vice versa; and Providing at least one airborne high-reliability switch accessible to the airborne pilot which feeds to the processor and which upon manipulation by the airborne pilot momentarily assumes a pilot-selected one of three possible switch positions respectively corresponding to:

airborne man-machine interface (MMI), ground-MMI, and ground-MMI with airborne MMI at rest mode wherein the airborne MMI is in an inoperative mode, which does not accept inputs from a first time-point at which the airborne pilot selects a position other than the airborne man-machine position and until a second later time-point at which the airborne pilot selects the airborne man-machine interface position, thereby to prevent inadvertent operation of the airborne MMI while the airborne pilot is at rest wherein when the remote pilot is in-command and the aircraft management computer detects loss of uplink communication, the aircraft management computer automatically reverts to automatic pilot-in-command mode, until such time as the airborne pilot actively assumes command.

* * * * *